United States Patent
Sato et al.

[11] Patent Number: 5,919,532
[45] Date of Patent: Jul. 6, 1999

[54] ACTIVE MATRIX SUBSTRATE, METHOD FOR FABRICATING THE SAME, AND LIQUID CRYSTAL DISPLAY DEVICE

[75] Inventors: Takashi Sato, Tenri; Yoshihiro Izumi, Kashihara; Kazuhiro Emoto, Nagaokakyo, all of Japan

[73] Assignee: Sharp Kabushiki Kaisha, Osaka, Japan

[21] Appl. No.: 08/822,431

[22] Filed: Mar. 21, 1997

[30] Foreign Application Priority Data

Mar. 25, 1996 [JP] Japan ..................................... 8-068805

[51] Int. Cl.$^6$ .................................................. G02F 1/1335
[52] U.S. Cl. .............................. 428/1; 349/106; 349/108; 427/384
[58] Field of Search ................. 428/1; 349/108, 349/106; 427/384

[56] References Cited

FOREIGN PATENT DOCUMENTS

| 4-123005 | 4/1992 | Japan . |
| 7-134290 | 5/1995 | Japan . |

*Primary Examiner*—Alexander Thomas
*Attorney, Agent, or Firm*—David G. Conlin; George W. Neuner

[57] ABSTRACT

An active matrix substrate according to the present invention includes a scanning line, a signal line, a pixel electrode, a switching element connected with the scanning line, the signal line, and the pixel electrode, and a color pixel portion, wherein at least a portion of the scanning line and the signal line and at least a region of the switching element are covered with a water-repellent organic resin protection film, and the color pixel portion is composed of hydrophilic color ink applied to a portion of the substrate surrounded by the organic resin protection film.

18 Claims, 5 Drawing Sheets

Application of resin composition, drying by heating

ACTIVE MATRIX SUBSTRATE, METHOD FOR FABRICATING THE SAME, AND LIQUID CRYSTAL DISPLAY DEVICE

BACKGROUND OF THE INVENTION

1. Field of the Invention

The present invention relates to an active matrix substrate, a liquid crystal display device, and a method for fabricating such an active matrix substrate. More particularly, the present invention relates to an active matrix substrate and a liquid crystal display device which are thin, inexpensive, and excellent in display quality (i.e., free from color blur or color mixture and having a high aperture ratio to provide bright display images), and a method for easily fabricating such an active matrix substrate.

2. Description of the Related Art

In recent years, color liquid crystal display devices have been increasingly used for liquid crystal TV sets and various information apparatuses. For such color liquid crystal display devices, a color filter composed of colored pixels including color ink of the three primary colors, i.e., red (R), green (G), and blue (B) arranged on a transparent substrate is generally used.

Conventionally, such a color filter is typically fabricated by a photolithographic method where a photo-sensitive resist with pigments dispersed therein is patterned in a photolithographic process. According to this method, the photolithographic process is required to be repeated three times for the R, G, and B colored pixels. This complicates the fabrication process of the color filter, and thus increases the cost.

Such a color filter is generally disposed on a counter substrate of a liquid crystal display device, not on an active matrix substrate with thin film transistors (TFTs) formed thereon. This is because, if a color filter is disposed on an active matrix substrate, the following problems arise: (i) the reliability of TFTs may be lost due to the formation of the color filter; (ii) the production yield which has been lowered by the formation of the TFTs may be further lowered by the successive formation of the color filter; and (iii) it is difficult to form the color filter on the surface of the active matrix substrate having a complicated profile. When the color filter is disposed on the counter substrate, however, the following problem exists. That is, it is extremely difficult to precisely align pixels of the color filter with pixels of the active matrix substrate at the attachment of the counter substrate with the active matrix substrate in the fabrication of the liquid crystal display device. A margin is therefore required for an error of the alignment. For this purpose, a light-shading layer formed above pixel electrodes of the active matrix substrate is made somewhat larger. This reduces the entire area of the pixels, darkening resultant display images.

In order to overcome the above problem, Japanese Laid-Open Patent Publication No. 7-134290 proposes a liquid crystal display device using a color filter formed by directly applying color ink to pixel electrodes of an active matrix substrate. More specifically, R, G, and B color ink drops are applied to pixel electrodes of an active matrix substrate by an ink jet method to form a color filter directly on the active matrix substrate. This method does not require the photolithographic process and thus simplifies the fabrication process. As a result, an inexpensive color filter can be fabricated with high yield. Moreover, no consideration of an error in the alignment of pixels of the color filter with pixels of the active matrix substrate is required at the attachment of the counter substrate with the active matrix substrate in the fabrication of the liquid crystal display device. A light-shading layer is therefore not required to be enlarged for an alignment error, and thus the aperture ratio can be improved.

The above liquid crystal display device however has a drawback. In particular, uniform drops of color ink are injected from a nozzle by the ink jet method. Such color ink drops isotropically spread over pixel electrodes of a substantially rectangular shape. When the color ink is injected to spread to every corner of each pixel electrode, however, it intrudes beyond the pixel electrode into a portion which is not intended to be colored with this particular color ink, thereby causing color blur or color mixture between adjacent pixel electrodes.

In order to prevent such color blur and color mixture, Japanese Laid-Open Publication No. 4-123005 proposes a method for controlling the wettability (i.e., hydrophilicity/ hydrophobicity) of the surface to which color ink is to be applied. In this method, however, a hydrophobic resin film for preventing color blur and color mixture must be formed in addition to a protection film for protecting wirings on the active matrix substrate. This causes many other drawbacks such as the increased thickness of the active matrix substrate (and thus the resultant liquid crystal display device), the complicated fabrication process, and the increased fabrication cost.

In view of the above problems, it is desired to provide an active matrix substrate and a liquid crystal display device which are thin, inexpensive, and excellent in display quality (i.e., free from color blur or color mixture and having a high aperture ratio to provide bright display images), and a method for easily fabricating such an active matrix substrate.

SUMMARY OF THE INVENTION

The active matrix substrate of the present invention includes a scanning line, a signal line, a pixel electrode, a switching element connected with the scanning line, the signal line, and the pixel electrode, and a color pixel portion, wherein at least a portion of the scanning line and the signal line and at least a region of the switching element are covered with a water-repellent organic resin protection film, and the color pixel portion is composed of hydrophilic color ink applied to a portion of the substrate surrounded by the organic resin protection film.

In one embodiment of the invention, the organic resin protection film includes a resin having a monomer unit having a quaternary ammonium salt moiety represented by formula (I):

wherein $X^+$ is represented by formula (II):

wherein $R^1$, $R^2$, $R^3$, and $R^4$ are independently hydrogen, a substituted or non-substituted linear or branched alkyl group having 1 to 12 carbon atoms, or a substituted or non-substituted linear or branched alkenyl group having 2 to 8 carbon atoms.

In another embodiment of the invention, the monomer unit having the quaternary ammonium salt moiety is at least one monomer unit selected from the group consisting of a monomer unit represented by formula (III), a monomer unit represented by formula (IV), a monomer unit represented by formula (V), and a monomer unit represented by formula (VI):

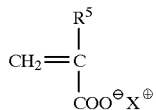

(III)

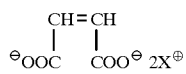

(IV)

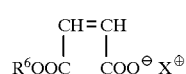

(V)

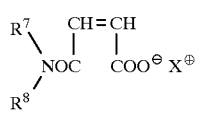

(VI)

wherein $R^5$ is hydrogen, a methyl group, or a trifluoromethyl group; $R^6$, $R^7$, and $R^8$ are independently selected from the group consisting of hydrogen, a substituted or non-substituted linear or branched alkyl group having 1 to 12 carbon atoms, a substituted or non-substituted linear or branched alkenyl group having 2 to 8 carbon atoms, a substituted or non-substituted aralkyl group, a substituted or non-substituted phenyl group, a heterocyclic group, a linear or branched fluorine-substituted alkyl group having 1 to 12 carbon atoms, and a fluorine-substituted alkylaryl group.

In still another embodiment of the invention, the resin included in the organic resin protection film further has a fluorine-containing monomer unit.

In still another embodiment of the invention, the fluorine-containing monomer unit is a monomer unit represented by formula (VII):

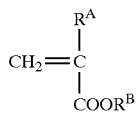

(VII)

wherein $R^A$ is hydrogen, a methyl group, or a trifluoromethyl group, $R^B$ is a linear or branched fluorine-substituted alkyl group having 1 to 22 carbon atoms or a fluorine-substituted alkylaryl group.

In still another embodiment of the invention, the resin included in the organic resin protection film further has at least one monomer unit selected from the group consisting of an acrylate monomer unit, a methacrylate monomer unit, a styrene monomer unit, a vinyl acetate monomer unit, and an isobutylene monomer unit.

In still another embodiment of the invention, the styrene monomer unit is represented by formula (VIII):

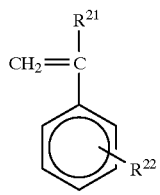

(VIII)

wherein $R^{21}$ is hydrogen or a methyl group, and $R^{22}$ is hydrogen, an alkyl group having 1 to 12 carbon atoms, a nitro group, or a halogen.

In still another embodiment of the invention, the organic resin protection film includes a resin having at least one monomer unit selected from the group consisting of a monomer unit represented by formula (III), a monomer unit represented by formula (IV), and a monomer unit represented by formula (V):

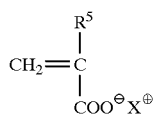

(III)

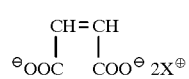

(IV)

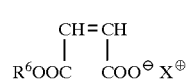

(V)

wherein $R^5$ is hydrogen or a methyl group; $R^6$ is selected from the group consisting of hydrogen, a substituted or non-substituted linear or branched alkyl group having 1 to 12 carbon atoms, a substituted or non-substituted alkenyl group having 2 to 8 carbon atoms, a substituted or non-substituted aralkyl group, a substituted or non-substituted phenyl group, and a heterocyclic group.

In still another embodiment of the invention, the organic resin protection film includes a resin having at least one monomer unit selected from the group consisting of a monomer unit represented by formula (III), a monomer unit represented by formula (IV), and a monomer unit represented by formula (V), and a fluorine-containing monomer unit:

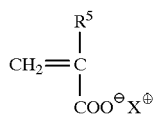

(III)

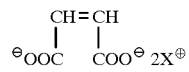

(IV)

-continued

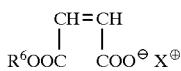 (V)

wherein $R^5$ is hydrogen or a methyl group; $R^6$ is selected from the group consisting of hydrogen, a substituted or non-substituted linear or branched alkyl group having 1 to 12 carbon atoms, a substituted or non-substituted alkenyl group having 2 to 8 carbon atoms, a substituted or non-substituted aralkyl group, a substituted or non-substituted phenyl group, and a heterocyclic group.

In still another embodiment of the invention, the organic resin protection film includes a resin having at least one monomer unit selected from the group consisting of a monomer unit represented by formula (V) and a monomer unit represented by formula (VI):

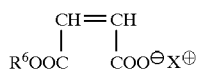 (V)

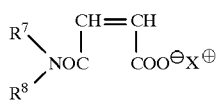 (VI)

wherein $R^6$ is selected from the group consisting of a linear or branched fluorine-substituted alkyl group having 1 to 12 carbon atoms and a fluorine-substituted alkylaryl group; $R^7$ and $R^8$ are independently selected from the group consisting of hydrogen, a substituted or non-substituted linear or branched alkyl group having 1 to 12 carbon atoms, a substituted or non-substituted linear or branched alkenyl group having 2 to 8 carbon atoms, a substituted or non-substituted aralkyl group, a substituted or non-substituted phenyl group, a heterocyclic group, a linear or branched fluorine-substituted alkyl group having 1 to 12 carbon atoms, and a fluorine-substituted alkylaryl group, at least one of $R^7$ and $R^8$ being selected from the group consisting of a linear or branched fluorine-substituted alkyl group having 1 to 12 carbon atoms and a fluorine-substituted alkylaryl group.

In still another embodiment of the invention, a composition for forming the organic resin protection film includes at least one type of polyamino compound.

In still another embodiment of the invention, the polyamino compound is a diamino compound represented by formula (X):

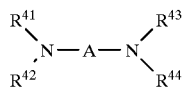 (X)

wherein A is a bivalent hydrocarbon residue; and $R^{41}$, $R^{42}$, $R^{43}$, and $R^{44}$ are independently hydrogen, a substituted or non-substituted linear or branched alkyl group having 1 to 12 carbon atoms, a substituted or non-substituted cycloalkyl group having 5 to 6 carbon atoms, or a substituted or non-substituted linear or branched alkenyl group having 2 to 8 carbon atoms.

In still another embodiment of the invention, a composition for forming the organic resin protection film is rendered hydrophobic from hydrophilic by a conversion of the quaternary ammonium salt moiety of the monomer unit to a —COOH group, to form a water-repellent organic resin protection film.

In still another embodiment of the invention, the organic resin protection film further contains carbon black.

The present invention also provides a liquid crystal display device. The liquid crystal display device of the present invention includes a pair of substrates and liquid crystal as a display medium interposed between the substrates, wherein at least one of the substrates is the active matrix substrate according to the present invention.

The present invention also provides a method for fabricating an active matrix substrate. The method includes the steps of: applying a hydrophilic composition for forming an organic resin protection film on a substrate; forming a water-repellent organic resin protection film by rendering the hydrophilic composition applied to the substrate hydrophobic; and forming a color pixel portion by applying hydrophilic color ink to a region of the substrate where the organic resin protection film is not formed.

In one embodiment of the invention, the color ink is applied to the substrate by an ink jet method.

In another embodiment of the invention, the hydrophilic composition applied to the substrate is rendered hydrophobic by heating.

Thus, the invention described herein makes possible the advantages of (1) providing an active matrix substrate which is thin, inexpensive, and excellent in display quality (i.e., free from color blur or color mixture and having a high aperture ratio to provide bright display images), (2) providing a liquid crystal display device which is thin, inexpensive, and excellent in display quality (i.e., free from color blur or color mixture and having a high aperture ratio to provide bright display images), and (3) providing a method for easily fabricating such an active matrix substrate.

These and other advantages of the present invention will become apparent to those skilled in the art upon reading and understanding the following detailed description with reference to the accompanying figures.

DESCRIPTION OF THE PREFERRED EMBODIMENTS

Figure 1:
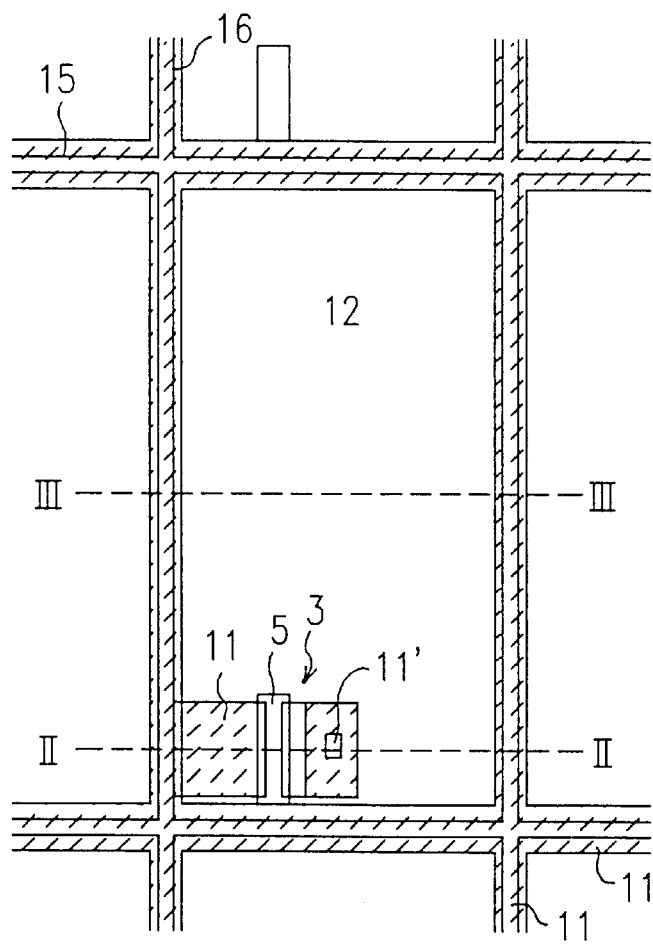
FIG. 1 is a schematic plan view of one color pixel portion of a preferred embodiment of the active matrix substrate according to the present invention.

The term "monomer unit" as used herein refers to a repeating unit constituting a resin (i.e., a polymer) included in a composition for forming a water-repellent organic resin protection film formed in an active matrix substrate according to the present invention. The term "quaternary ammonium monomer unit" as used herein refers to a monomer unit having a quaternary ammonium salt moiety. The term "fluorine-containing monomer unit" as used herein refers to a monomer unit which contains fluorine but does not have a quaternary ammonium salt moiety.

The active matrix substrate of the present invention includes scanning lines, signal lines, pixel electrodes, switching elements connected with these lines and electrodes, and color pixel portions. At least a portion of each of the scanning lines and each of the signal lines and at least a portion of each of the switching elements are covered with a water-repellent organic resin protection film. Each of the color pixel portions is composed of hydrophilic color ink applied to a portion of the substrate surrounded by the organic resin protection film.

The liquid crystal display device according to the present invention further includes liquid crystal as a display medium between a pair of opposing substrates. At least one of the substrates is an active matrix substrate according to the present invention.

Hereinbelow, the composition for forming the organic resin protection film, the active matrix substrate, and the liquid crystal display device will be described in detail.

A. Composition for forming organic resin protection film

The water-repellent organic resin protection film formed on the active matrix substrate according to the present invention is made from a composition including a polymer resin (or copolymer resin) having a quaternary ammonium salt moiety of a specific molecular structure.

A-1. Quaternary ammonium monomer unit

The above composition preferably includes a resin having a monomer unit having a quaternary ammonium salt moiety (hereinafter, such a monomer unit is referred to as a quaternary ammonium monomer unit) represented by formula (I) below:

wherein the cation portion $X^+$ of the quaternary ammonium salt moiety is any cation capable of providing ammonia or amine which easily volatilizes by heating. Preferably, $X^+$ is represented by formula (II) below:

wherein $R^1$, $R^2$, $R^3$, and $R^4$ are independently hydrogen, a substituted or non-substituted linear or branched alkyl group having 1 to 12, preferably 1 to 6, more preferably 1 to 4 carbon atoms, or a substituted or non-substituted linear or branched alkenyl group having 2 to 8, preferably 3 to 6, more preferably 3 to 4 carbon atoms. The alkyl group or the alkenyl group may be substituted with any substituent as long as the advantages of the present invention are not compromised. Typical examples of such a substituent include a hydroxyl group, a halogen, and an alkoxy group. A hydroxyl group is preferred.

In formula (II), preferably, $R^1$, $R^2$, $R^3$, and $R^4$ are independently selected from the group consisting of hydrogen, an alkyl group having 1 to 12 carbon atoms, a hydroxyalkyl group having 1 to 3 carbon atoms, an allyl group, and a methallyl group. More preferably, $R^1$, $R^2$, $R^3$, and $R^4$ are independently selected from the group consisting of hydrogen, an alkyl group having 1 to 4 carbon atoms, and an allyl group. Especially preferably, one of $R^1$, $R^2$, $R^3$, and $R^4$ is hydrogen, while the other three are independently selected from the group consisting of hydrogen, a methyl group, an ethyl group, a propyl group, and a butyl group. Most preferably, one of $R^1$, $R^2$, $R^3$, and $R^4$ is hydrogen, while the other three are independently selected from the group consisting of hydrogen, a methyl group, and an ethyl group. The cation portion having one of the above structures easily volatilizes by heating, which facilitates rendering the hydrophilic composition hydrophobic.

Specific examples of the cation portion include $NH_4^+$, $NH_3(CH_3)^+$, $NH_2(CH_3)_2^+$, $NH(n-C_3H_7)_3^+$, $NH(CH_3)_3^+$, $N(C_2H_5)_4^+$, $NH(C_2H_5)_3^+$, $NH_2(C_2H_5)_2^+$, $NH_3(C_2H_5)^+$, $NH(C_2H_5)_2(CH_3)^+$, $NH(CH_3)_2(n-C_3H_7)^+$, $NH(CH_3)_2(n-C_4H_9)^+$, $NH(iso-C_3H_7)_3^+$, $NH_3(iso-C_3H_7)^+$, $NH_2(n-C_4H_9)_2^+$, $NH_3(n-C_4H_9)^+$, $NH(CH_2CH=CH_2)_3^+$, $NH_2(CH_2CH=CH_2)_2^+$, $NH(C(CH_3)HCH=CH_2)_3^+$, $NH(CH_2C(CH_3)=CH_2)_3^+$, $NH_3(n-C_6H_{13})^+$, $NH_3(n-C_{12}H_{25})^+$, $NH_3(n-C_8H_{17})^+$, $N(CH_3)_4^+$, $N(CH_3)(C_2H_5)_3^+$, $N(CH_3)_2(C_2H_5)_2^+$, $N(CH_3)_3(CH_2CH=CH_2)^+$, $NH_2(C_2H_4OH)_2^+$, $NH_3(C_2H_4OH)^+$, $NH_3(CH_2OH)^+$, $NH_2(CH_2OH)_2^+$, $NH(C_2H_4OH)_3^+$, and $NH(CH_2OH)_3^+$. Among these, $NH_4^+$, $NH_3(CH_3)^+$, $NH_2(CH_3)_2^+$, $NH(CH_3)_3^+$, $NH_3(C_2H_5)^+$, $NH_2(C_2H_5)_2^+$, and $NH(C_2H_5)_3^+$ are preferred.

When the resin having the quaternary ammonium monomer unit is heated, the cation portion of the quaternary ammonium salt easily volatilizes as ammonia or amine (primary amine, secondary amine, or tertiary amine). As a result, the quaternary ammonium salt is easily converted to a carboxylic acid or a carboxylate. In other words, such a resin having the quaternary ammonium monomer unit exhibits good adhesion to a substrate (i.e., good hydrophilicity) during the application to the substrate when the quaternary ammonium salt moiety exists in the resin. After the formation of the organic resin protection film on the substrate, however, the resin exhibits good water repellency since the hydrophilic moiety (i.e., the salt moiety) has been removed from the resin.

The conversion of the resin from hydrophilic to hydrophobic may occur by the following reaction:

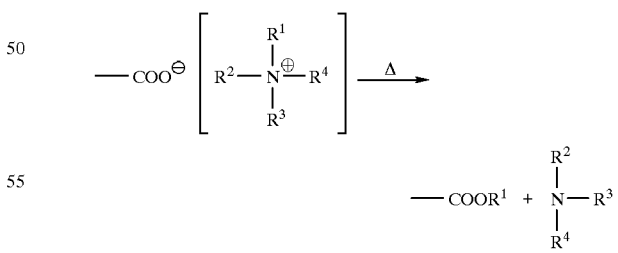

Specific examples of the liberated amine compound include:

Ammonia;

Primary amines such as methylamine, ethylamine, n-butylamine, n-propylamine, isopropylamine, n-hexylamine, n-stearylamine, n-octylamine, ethanolamine, methanolamine, benzylamine, 4-methylbenzylamine, and 4-chlorobenzylamine;

Secondary amines such as dimethylamine, diethylamine, dimethanolamine, diethanolamine, N-ethyl-N-ethanolamine, dipropylamine, N-methylbenzylamine, diallylamine, dimethallylamine, dibutylamine, and N-methyl-N-ethylamine; and Tertiary amines such as trimethylamine, triethylamine, tripropylamine, N,N-diethylethanolamine, N,N-dimethyl-N-ethylamine, N,N-diethyl-N-methylamine, N,N-dimethyl-N-propylamine, trimethanolamine, triethanolamine, triallylamine, N,N-dimethyl-N-allylamine, trimethallylamine, N,N-diethyl-N-butylamine, and N,N-dimethylbenzylamine.

Accordingly, the cation portion $X^+$ of formula (I) above can be any cation capable of providing ammonia or an amine as listed above which easily volatilizes by heating.

Preferable quaternary ammonium monomer units are represented by formulae (III) to (VI) below:

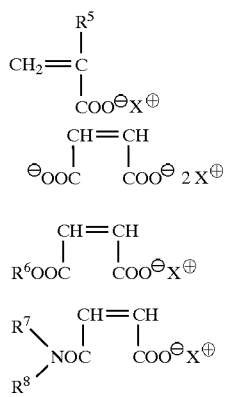

wherein $R^5$ is hydrogen, a methyl group, or a trifluoromethyl group; $R^6$, $R^7$, and $R^8$ are independently selected from the group consisting of hydrogen, a substituted or non-substituted linear or branched alkyl group having 1 to 12, preferably 1 to 6, more preferably 2 to 4 carbon atoms, a substituted or non-substituted linear or branched alkenyl group having 2 to 8, preferably 3 to 6, more preferably 3 to 4 carbon atoms, a substituted or non-substituted linear or branched aralkyl group, a substituted or non-substituted phenyl group, a heterocyclic group, a linear or branched fluorine-substituted alkyl group having 1 to 12, preferably 1 to 8, more preferably 1 to 4 carbon atoms, and a fluorine-substituted alkylaryl group. The alkyl group, the alkenyl group, aralkyl group, and the phenyl group may be substituted with any substituent as long as the advantages of the present invention are not compromised. Typical examples of such a substituent preferably include a hydroxyl group, a nitro group, a sulfonic acid group, and a halogen. A hydroxyl group is most preferred.

The alkyl group is preferably a methyl group or an ethyl group. The alkenyl group is preferably an allyl group or a methallyl group. The aralkyl group is preferably a benzyl group. The heterocyclic group is preferably a nitrogen-containing five membered ring or an oxygen-containing five membered ring.

The fluorine-substituted alkyl group and the fluorine-substituted alkylaryl group may be perfluoro-substituted or partially fluorine-substituted. The fluorine-substituted alkylaryl group is preferably a phenyl group substituted with fluorine-substituted alkyl group.

The water repellency of the resultant organic resin protection film may further improve if the quaternary ammonium monomer unit has a fluorine-containing moiety in addition to the quaternary ammonium salt moiety. Examples of such a quaternary ammonium monomer unit having a fluorine-containing moiety include: a quaternary ammonium monomer unit represented by formula (V) above where $R^6$ is selected from the group consisting of a linear or branched fluorine-substituted alkyl group having 1 to 12 carbon atoms and a fluorine-substituted alkylaryl group; and a quaternary ammonium monomer unit represented by formula (VI) above where at least one of $R^7$ and $R^8$ is selected from the group consisting of a linear or branched fluorine-substituted alkyl group having 1 to 12 carbon atoms and a fluorine-substituted alkylaryl group.

Specific examples of the quaternary ammonium monomer unit having a fluorine-containing moiety include examples E-1 to E-21 below:

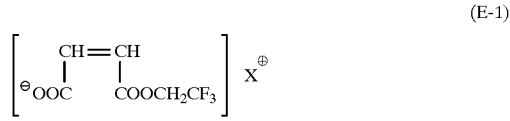

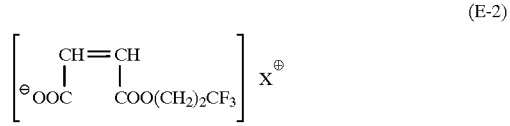

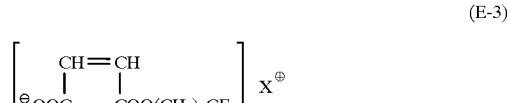

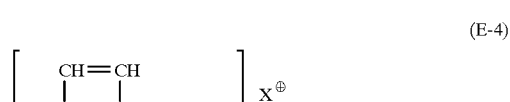

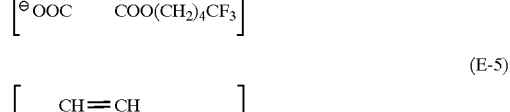

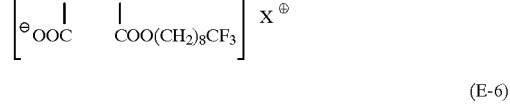

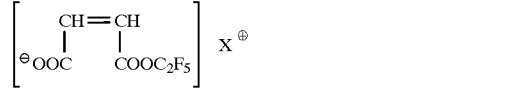

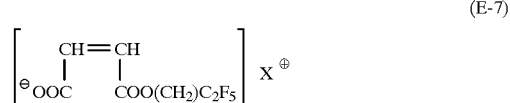

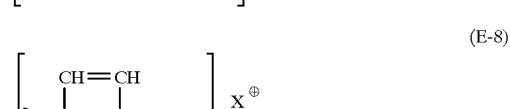

(E-10) 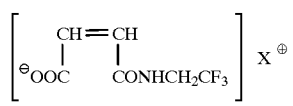

(E-11) 

(E-12) 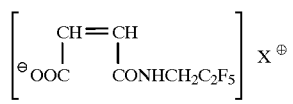

(E-13) 

(E-14) 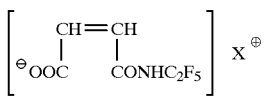

(E-15) 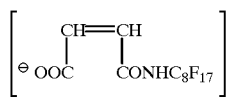

(E-16) 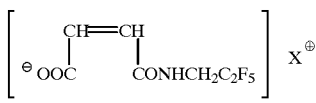

(E-17) 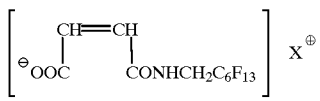

(E-18) 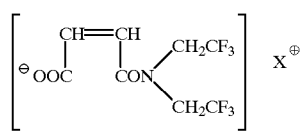

(E-19) 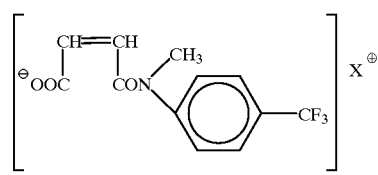

(E-20) 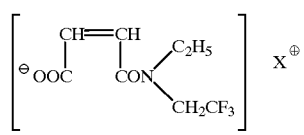

(E-21) 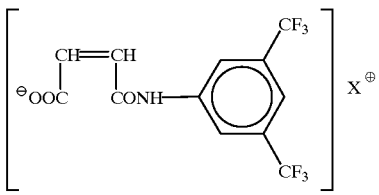

Among the above exemplified monomer units, examples E-6, E-7, E-8, E-14, E-15, and E-18 are preferable because they have excellent water repellency.

The above examples of the quaternary ammonium monomer unit may be used alone or in combination.

A-2. Fluorine-containing monomer unit

Preferably, the resin included in the composition for forming the organic resin protection film further has a fluorine-containing monomer unit, in addition to the above-described quaternary ammonium monomer unit. With the fluorine-containing monomer unit included in the resin, the water repellency of the resultant organic resin protection film further improves. In particular, the fluorine-containing monomer unit is preferably included in the resin where the quaternary ammonium monomer unit does not have a fluorine-containing moiety. More specifically, the fluorine-containing monomer unit is preferably included in the resin where the quaternary ammonium monomer unit represented by formula (III) or (IV) above is used, or where the substituents $R^6$, $R^7$, and $R^8$ in the quaternary ammonium monomer unit represented by formula (V) or (VI) are not a fluorine-containing substituent.

In the cases of using the above quaternary ammonium monomer having a fluorine-containing moiety and the fluorine-containing monomer unit, the fluorine functionality exists in each resin molecule. The water repellency of the resultant organic resin protection film is especially high, compared with the case of simply adding a fluorine-containing compound (to be described later) to the compound. Moreover, since problems such as bleeding-out which tends to occur in the case of simply adding a fluorine-containing compound do not occur, the adhesion of the composition to the substrate is not lowered. The resin having the fluorine functionality is therefore excellent both in the adhesion of the composition to the substrate and in the water repellency of the organic resin protection film.

A preferable fluorine-containing monomer unit can be formed from any monomer which is copolymerizable with a monomer capable of forming the quaternary ammonium monomer unit and contains fluorine. Examples of a preferable fluorine-containing monomer unit include a vinylidene fluoride monomer unit, a vinyl fluoride monomer unit, an ethylene trifluoride monomer unit, an ethylene tetrafluoride monomer unit, and a monomer unit represented by formula (VII) below:

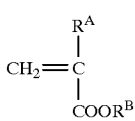 (VII)

wherein $R^A$ is hydrogen, a methyl group, or a trifluoromethyl group, $R^B$ is a linear or branched fluorine-substituted alkyl group having 1 to 22 carbon atoms or a fluorine-substituted alkylaryl group. More preferably, $R^B$ is a linear or branched fluorine-substituted alkyl group having 1 to 18 carbon atoms, especially α,α,α-trifluoromethyl group-containing alkyl group (e.g., $CF_3(CH_2)_n$—where n is an integer of 0 to 8).

Preferably, the fluorine-containing monomer unit is a monomer unit represented by formula (VII) above. A monomer capable of forming the fluorine-containing monomer unit represented by formula (VII) can be easily synthesized by reacting, for example, acryloyl chloride (forming a monomer unit where $R^A$ in formula (VII) is hydrogen) or methacryloyl chloride (forming a monomer unit where $R^A$ in formula (VII) is a methyl group) with a fluorine-containing alcohol such as $R^BOH$ (wherein $R^B$ is as defined above) in a solvent (e.g., methylethylketone) by use of a basic catalyst. Some of these compounds are commercially available.

Specific examples of the monomer capable of forming the fluorine-containing monomer unit include 3,3,3-trifluoropropyl acrylate, 3,3,3-trifluoropropyl methacrylate, 2,2,2-trifluoroethyl acrylate, 4,4,4-trifluorobutyl methacrylate, α,α,α,2,2,2-hexafluoroethyl methacrylate, α,α,α,3,3,3-hexafluoropropyl methacrylate, and 3,3,4,4,4-pentafluorobutyl acrylate.

The content of the fluorine-containing monomer unit in the resin having the quaternary ammonium monomer unit and the fluorine-containing monomer unit is preferably in the range of about 2 to about 90 mol %, more preferably in the range of about 10 to about 70 mol %, though the content varies depending on the use of the resin. When the content is below about 2 mol %, the water repellency of the resultant organic resin protection film tends to be insufficient. When the content exceeds about 90 mol %, the adhesion of the composition to the substrate tends to be insufficient.

The content of the quaternary ammonium monomer unit in the resin having the quaternary ammonium monomer unit and the fluorine-containing monomer unit is preferably in the range of about 10 to about 70 mol %, more preferably in the range of about 30 to about 60 mol %, though the content varies depending on the use of the resin. When the content is below about 10 mol %, the adhesion of the composition for forming the organic resin protection film to the substrate tends to be insufficient. Further, the dispersibility (solubility) in a polar solvent (e.g., water, alcohol, and a mixture thereof) tends to be insufficient, making it difficult to prepare a stable aqueous suspension, i.e., the composition for forming the organic resin protection film. When the content exceeds about 70 mol %, the water repellency of the resultant organic resin protection film tends to be insufficient.

The above exemplified fluorine-containing monomer units may be used alone or in combination.

A-3. Comonomer unit

The resin having the quaternary ammonium monomer unit and optionally the fluorine-containing monomer unit may also have another monomer unit as required (hereinafter, such an additional monomer unit is referred to as a comonomer unit). The comonomer unit may be used in order to further improve the properties such as the viscosity of the composition, the binder property of the resin, the dispersibility (solubility) of the resin in water or alcohol, the coating property of the organic resin protection film (e.g., water repellency, blocking resistance, and cracking resistance), and the heat resistance.

As a monomer capable of forming the comonomer unit (hereinafter, such a monomer is referred to as a comonomer), a radical-polymerizable ethylenically unsaturated monomer is generally used. Examples of the ethylenically unsaturated monomer include acrylate, methacrylate, a styrene derivative, vinyl acetate, and isobutylene. Among these monomers, acrylate, methacrylate and vinyl acetate are preferred because they can provide a uniform composition and an organic resin protection film having excellent water repellency.

Examples of the acrylate include methyl acrylate, ethyl acrylate, n-butyl acrylate, 2-ethylhexyl acrylate, dimethylaminoethyl acrylate, 2-ethoxy acrylate, t-butyl acrylate, isobutyl acrylate, cyclohexyl acrylate, glycidyl acrylate, 2-hydroxyethyl acrylate, tetrahydrofurfuryl acrylate, n-lauryl acrylate, n-stearyl acrylate, dimethylaminoethyl acrylate, and diethylaminoethyl acrylate. An alkyl acrylate having 1 to 12 carbon atoms is preferred, and an alkyl acrylate having 1 to 8 carbon atoms is more preferred, because they can provide a uniform composition and an organic resin protection film having excellent water repellency.

Examples of the methacrylate include methyl methacrylate, ethyl methacrylate, n-butyl methacrylate, isobutyl methacrylate, 2-hydroxyethyl methacrylate, 2-ethoxy methacrylate, n-octyl methacrylate, n-lauryl methacrylate, glycidyl methacrylate, 2-ethylhexyl methacrylate, t-butyl methacrylate, cyclohexyl methacrylate, n-stearyl methacrylate, tetrahydrofurfuryl methacrylate, diethylaminoethyl methacrylate, and dimethylaminoethyl methacrylate. An alkyl methacrylate having 1 to 12 carbon atoms is preferred, and an alkyl methacrylate having 1 to 8 carbon atoms is more preferred, because they can provide a uniform composition and an organic resin protection film having excellent water repellency.

Preferably, the styrene monomer unit (formed from a styrene derivative) is represented by formula (VIII) below.

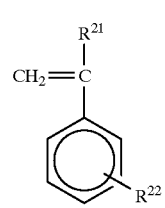

(VIII)

wherein $R^{21}$ is hydrogen or a methyl group, and $R^{22}$ is hydrogen, an alkyl group having 1 to 12 carbon atoms, a nitro group, or a halogen. Examples of the styrene derivative include styrene, α-methylstyrene, x-methylstyrene, x-nitrostyrene (x: meta, para, or ortho), and para-chlorostyrene. Styrene and α-methylstyrene are preferred because they provide a uniform composition and an organic resin protection film having excellent water repellency.

Any monomer other than those listed above, such as a maleic acid diester derivative, may be used as the comonomer. Examples of a maleic acid diester derivative include di(2-ethylhexyl) maleate, diethyl maleate, di(n-butyl) maleate, and dioctyl maleate. Di(2-ethylhexyl) maleate and diethyl maleate are preferred because they provide a uniform composition and an organic resin protection film having excellent water repellency.

The above exemplified comonomer units can be used alone or in combination.

A-4. Combination of monomer units

In a preferred embodiment of the present invention, the composition for forming the organic resin protection film includes a resin having a monomer unit having at least one quaternary ammonium salt moiety, selected from the group consisting of the monomer unit represented by formula (III) below, the monomer unit represented by formula (IV) below, and the monomer unit represented by formula (V) below:

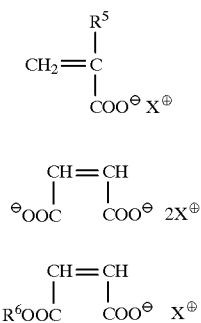

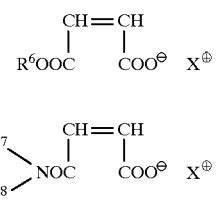

wherein $R^5$ is hydrogen or a methyl group, $R^6$ is selected from the group consisting of hydrogen, a substituted or non-substituted linear or branched alkyl group having 1 to 12 carbon atoms, a substituted or non-substituted linear or branched alkenyl group having 2 to 8 carbon atoms, a substituted or non-substituted aralkyl group, a substituted or non-substituted phenyl group, and a heterocyclic group.

In another preferred embodiment of the present invention, the composition for forming the organic resin protection film includes a resin having a monomer unit having at least one quaternary ammonium salt moiety, selected from the group consisting of the monomer unit represented by formula (III) below, the monomer unit represented by formula (IV) below, and the monomer unit represented by formula (V) below, and a fluorine-containing monomer unit:

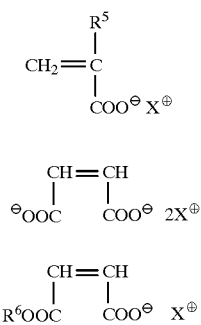

wherein $R^5$ is hydrogen, a methyl group, or a trifluoromethyl group, $R^6$ is selected from the group consisting of hydrogen, a substituted or non-substituted linear or branched alkyl group having 1 to 12 carbon atoms, a substituted or non-substituted linear or branched alkenyl group having 2 to 8 carbon atoms, a substituted or non-substituted aralkyl group, a substituted or non-substituted phenyl group, and a heterocyclic group. Preferably, the resin includes 2 to 90 mol % of the fluorine-containing monomer unit and 10 to 70 mol % of the monomer unit containing the quaternary ammonium salt moiety.

In yet another preferred embodiment of the present invention, the composition for forming the organic resin protection film includes a resin having a monomer unit having at least one quaternary ammonium salt moiety, selected from the group consisting of the monomer unit represented by formula (V) below and the monomer unit represented by formula (VI) below:

wherein $R^6$ is selected from the group consisting of a linear or branched fluorine-substituted alkyl group having 1 to 12 carbon atoms and a fluorine-substituted alkylaryl group; $R^7$ and $R^8$ are independently selected from the group consisting of hydrogen, a substituted or non-substituted linear or branched alkyl group having 1 to 12 carbon atoms, a substituted or non-substituted linear or branched alkenyl group having 2 to 8 carbon atoms, a substituted or non-substituted aralkyl group, a substituted or non-substituted phenyl group, a heterocyclic group, a linear or branched fluorine-substituted alkyl group having 1 to 12 carbon atoms, and a fluorine-substituted alkylaryl group. At least one of $R^7$ and $R^8$ is selected from the group consisting of a linear or branched fluorine-substituted alkyl group having 1 to 12 carbon atoms and a fluorine-substituted alkylaryl group.

In any of the above preferred embodiments of the present invention, the resin included in the composition for forming the organic resin protection film may further have at least one type of ethylenically unsaturated monomer unit selected from the group consisting of an acrylate monomer unit, a methacrylate monomer unit, a styrene monomer unit, a vinyl acetate monomer unit, and an isobutylene monomer unit.

When the resin has the above fluorine-containing monomer unit and/or the comonomer unit in combination with the quaternary ammonium monomer unit, the resin can be a copolymer having a plurality of monomer units, or a blend of homopolymers. The resin is preferably in the form of a copolymer because the resultant organic resin protection film has excellent uniformity and thus strength and stability of the film can be improved.

A-5. Preparation of resin

Hereinbelow, the preparation of the resin having the quaternary ammonium monomer unit to be included in the composition for forming the organic resin protection film used in the active matrix substrate of the present invention will be described.

The resin having the monomer unit having the quaternary ammonium salt moiety represented by formula (I) below:

can be prepared from a monomer capable of forming the quaternary ammonium monomer unit by any appropriate known method. The monomer capable of forming the quaternary ammonium monomer unit may be a carboxyl group-containing monomer. Herein, the carboxyl group-containing monomer is defined to include the monomer containing a carboxyl group and the acid anhydrides thereof. Similarly, a carboxyl group-containing polymer is defined to include the polymer containing a carboxyl group and the acid anhydrides thereof. Examples of the carboxyl group-containing monomer include acrylic acid, methacrylic acid, crotonic acid, maleic acid, and maleic acid monoester.

The resin having the quaternary ammonium monomer unit can be obtained by, for example, polymerizing (or copolymerizing) the carboxyl group-containing monomer and another monomer as required and treating the resultant carboxyl group-containing polymer with ammonia or an amine compound. Alternatively, the resin having the quaternary ammonium monomer unit can be obtained by reacting a carboxyl group-containing monomer with ammonia or amine to form a monomer containing a quaternary ammonium salt moiety and polymerizing the monomer. In general, the former method, i.e., polymerizing a carboxyl group-containing monomer and treating the resultant polymer with ammonia or an amine compound is used. This is because polymerization in connection with this method is easy, and thus a resin having desired properties (e.g., molecular weight and viscosity) can be easily obtained. According to this method, the carboxyl group-containing polymer obtained in any appropriate manner is dissolved in an appropriate organic solvent with a predetermined concentration, and the resultant solution is mixed with ammonia water or amine (an aqueous amine solution as required). The mixed solution is then agitated while being heated so as to obtain the resin having the quaternary ammonium monomer unit. The heating temperature is preferably in the range of room temperature to about 80° C., more preferably, in the range of about 60° C. to about 80° C., though it may vary depending on the type of ammonia or amine used. The heating time is typically in the range of one hour to several days, though it may vary depending on the heating temperature, the agitation speed and the like.

For example, the quaternary ammonium monomer unit represented by formula (III) below:

(wherein $R^5$ and $X^+$ are as defined above)
can be obtained by polymerizing a carboxyl-group-containing monomer such as acrylic acid and methacrylic acid with another monomer as required and treating the resultant polymer with ammonia or a predetermined amine compound.

The quaternary ammonium monomer units represented by formulae (IV), (V), and (VI) below:

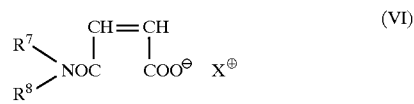

(wherein $R^6$, $R^7$, $R^8$, and $X^+$ are as defined above)
can be derived from maleic acid or a derivative thereof. The resin having the quaternary ammonium monomer unit represented by formula (IV) can be obtained, for example, by polymerizing maleic anhydride monomer with another monomer as required and treating the resultant polymer with ammonia or a predetermined amine compound. The resin having the quaternary ammonium monomer unit represented by formula (V) can be obtained, for example, by polymerizing maleic acid monoester with another monomer as required and treating the resultant polymer with ammonia or a predetermined amine compound. Alternatively, maleic anhydride is polymerized with another monomer as required, and the resultant polymer is reacted with a compound such as $R^6OH$ to partially esterify the polymer, and treated with ammonia or a predetermined amine compound. The latter method is preferred when $R^6$ is a fluorine-containing substituent. The resin having the quaternary ammonium monomer unit represented by formula (VI) can be obtained, for example, by polymerizing a maleic anhydride with another monomer as required, reacting the resultant polymer with $R^7R^8NH$ to partially amidize the polymer, and treating the resultant polymer with ammonia or a predetermined amine compound.

The resin having the fluorine-containing monomer unit and/or the comonomer unit, together with the quaternary ammonium monomer unit, can be obtained by copolymerizing a monomer capable of forming the quaternary ammonium monomer unit together with a monomer capable of forming the fluorine-containing monomer unit and/or a comonomer and treating the resultant copolymer with ammonia or amine as described above, as required. Alternatively, a resin having the quaternary ammonium monomer unit and a resin having the fluorine-containing monomer unit and/or a resin having the comonomer unit may be blended by any appropriate known method.

The monomer capable of forming the fluorine-containing monomer unit may be a fluorine-containing monomer or a monomer capable of forming the fluorine-containing monomer unit by the treatment after polymerization. For example, the fluorine-containing monomer unit represented by formula (VII) below:

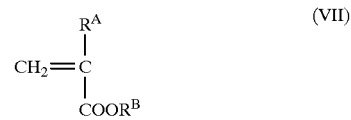

(wherein $R^A$ and $R^B$ are as defined above)
can also be obtained by polymerizing acrylic acid, methacrylic acid, or the like and esterifying the resultant polymer with a compound such as $R^BOH$.

A-6. Fluorine-containing compound

Preferably, the composition for forming the organic resin protection film further includes any fluorine-containing compound. The fluorine-containing compound is preferably a fluorine type surfactant (i.e., a fluorine-containing surfactant). The fluorine-containing compound is especially useful when the resin included in the composition neither has a quaternary ammonium monomer unit having a fluoride-containing moiety nor a fluorine-containing monomer unit. In such a case, the water repellency of the resultant organic resin protection film is improved by using the fluorine-containing compound. The content of the fluorine-containing compound in the compound is preferably in the range of about 1 to about 30 parts by weight, more preferably in the range of about 1 to about 10 parts by weight, for 100 parts by weight of the solid content of the compound, though it may vary depending on the identity of the fluorine-containing compound.

A preferred fluorine-containing compound is represented by formula (IX) below:

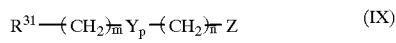

wherein $R^{31}$ is a fluorine-substituted alkyl group having 1 to 12 carbon atoms, Y is —COO—, —OCO—, —CONH—, —CO—, —O—, —S—, a phenylene group, —SO$_2$—, —SO$_3$—, or —SO$_2$NH—, Z is —COOH, —OH, —CONH$_2$, —SO$_2$NH$_2$, —NH$_2$, —SO$_3^-$NH$_4^+$, —COO$^-$NH$_4^+$, —COO$^-$NH$^+$(C$_2$H$_5$)$_3$, or —NH$_3^+$. B$^-$ (B$^-$ is an anion residue), m and n are independently integers in the range of 0 to 6, and p is 0 or 1.

The fluorine-containing compound may be added at the polymerization of the monomer or at any step in the preparation of the composition.

A-7. Polyamino compound

Preferably, the composition for forming the organic resin protection film further includes at least one type of a polyamino compound. Herein, the polyamino compound is defined as a compound having two or more amino groups. The polyamino compound may be a diamino compound, a triamino compound, and so on. The diamino compound is preferred. Such a polyamino compound tends to increase the viscosity of the resultant composition. This is probably because the polyamino compound serves to ion-crosslink carboxyl groups in the resin included in the composition. The carboxyl group in the resin may be derived from the anion portion of the quaternary ammonium monomer unit in the resin, or it may be a free carboxyl group which has not formed quaternary ammonium salt. As the viscosity of the composition increases, the composition is markedly prevented from flowing at the application of the composition to a substrate. This is therefore effective when the organic resin protection film is formed by printing, especially, offset printing and screen printing where the viscosity of the composition as high as about 1000 cp or more is required in most cases. The viscosity of the composition has substantially a proportional relationship with the degree of the crosslinking, though the relationship may vary depending on other factors such as the acid value of the resin, the type of the polyamino compound, the type of a colorant which may be included in the composition (a pigment or a dye), and the like. In other words, as the degree of the crosslinking increases, the viscosity of the composition increases.

Examples of the polyamino compound include ethylenediamine (i,e., 1,2-diaminoethane), m-xylenediamine, p-xylenediamine, p-phenylenediamine, 1,4-diaminobutane, 1,5-diaminopentane, 1,6-diaminohexane, 2,2-dimethyl-1,3-diaminopropane, N,N,N',N'-tetramethyl-1,2-diaminoethane, piperazine, N,N'-diethylpiperazine, 1,4-diaminocyclohexane, 4,4'-diamino-2,2'-disulfostilbene, 1,3-diamino-2-propanol ((H$_2$NCH$_2$)$_2$CHOH), 3,3'-diaminodipropylamine, 2,4-diamino-6-methyl-5-triazine, N,N'-diallyl-1,2-diaminopropane, N,N'-dimethyl-1,2-diaminoethane, 1,3-diamino-cyclopentane, and N,N'-dibutyl-1,2-diaminoethane.

The diamino compound represented by formula (X) below is preferred because it is excellent in improving the viscosity and inexpensive.

wherein A is a bivalent hydrocarbon residue, and $R^{41}$, $R^{42}$, $R^{43}$, and $R^{44}$ are independently hydrogen, a substituted or non-substituted linear or branched alkyl group having 1 to 12 carbon atoms, a substituted or non-substituted cycloalkyl group having 5 to 6 carbon atoms, or substituted or non-substituted linear or branched alkenyl group having 2 to 8 carbon atoms. The alkyl group is preferably a methyl group or an ethyl group. The alkenyl group is preferably an allyl group or a methallyl group. The alkyl group or the alkenyl group may be substituted with any substituent as long as the advantages of the present invention are not compromised. Typical examples of such a substituent include a hydroxyl group, a halogen, and an alkoxy group (e.g., a methoxy group). A hydroxyl group is preferred.

More preferably, A is a linear alkyl group having 2 to 12 carbon atoms, and $R^{41}$, $R^{42}$, $R^{43}$, and $R^{44}$ are independently hydrogen, a methyl group, or an ethyl group. Especially preferred diamino compounds are ethylenediamine, N,N'-diethylethylenediamine, N,N,N',N'-tetramethylethylenediamine, and N,N,N',N'-tetramethyl-1,3-diaminobutane. These compounds have excellent ion crosslinking properties and high volatilities at heating (as will be described later). The resultant composition therefore becomes hydrophobic from hydrophilic swiftly and easily. Furthermore, such compounds are inexpensive.

The polyamino compound may be added at the polymerization of the monomer or at any step in the preparation of the composition.

The content of the polyamino compound in the composition is preferably in the range of about 0.1 to about 30 parts by weight, more preferably in the range of about 1 to about 5 parts by weight, for 100 parts by weight of the solid content of the composition, though it may vary depending on the identity of the polyamino compound. When the content is below about 0.1 parts by weight, the viscosity-improving effect tends to be insufficient. When the content exceeds about 30 parts by weight, gelation of the composition may occur.

Preferably, the ion-crosslinked polyamino compound is liberated and easily volatilized by heating after the application of the composition to a substrate.

The ion crosslinking of the resin containing a carboxyl group with the polyamino compound and the liberation of the polyamino compound by heating may occur by the following reaction, for example.

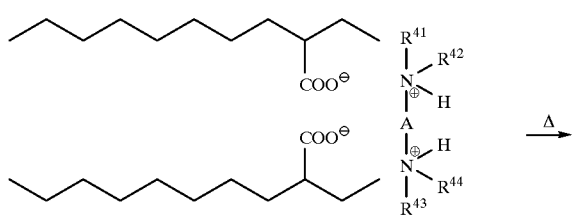

-continued

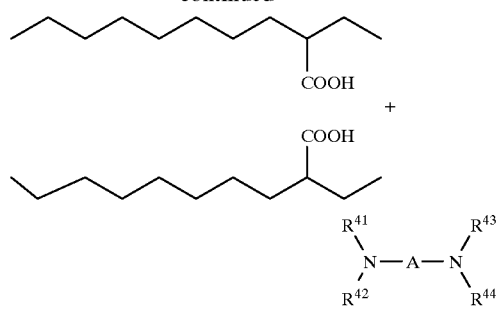

As is apparent from the above reaction scheme, the polyamino compound may also possess the same function as that possessed by the above-described quaternary ammonium salt moiety in the composition for forming the organic resin protection film. More specifically, the polyamino compound may possess the function of rendering the composition hydrophilic and then rendering the hydrophilic composition hydrophobic by heating. Accordingly, the polyamino compound can be used together with any carboxyl group-containing resin which does not have a quaternary ammonium salt moiety, as well as with the resin having the quaternary ammonium monomer unit, hence forming a composition which becomes hydrophobic from hydrophilic by heating. Herein, the carboxyl group-containing resin is defined to include a resin having the quaternary ammonium monomer unit.

The carboxyl group-containing resin which may be used together with the polyamino compound is not limited, but typically includes a condensation polymerization type resin, a radical polymerization type resin, and an addition polymerization type resin. A resin having a large acid value is preferable in order to enhance the ion crosslinking. The acid value of the carboxyl group-containing resin is preferably 20 or more, more preferably 30 or more. When the acid value is below 20, the ion crosslinking is insufficient. The resultant composition does not have a desired viscosity in many cases. The radical polymerization type resin is preferable because it can have a large acid value relatively easily. The radical polymerization type resin is preferably a copolymer resin having at least one type of monomer unit selected from the group consisting of methacrylic acid, acrylic acid, crotonic acid, maleic anhydride, maleic acid, and maleic acid monoester.

Alternatively, the viscosity of the composition can be adjusted to a desired value, and the solubility of the resin in water, i.e., the hydrophilicity of the resin can be enhanced, by including a monoamino compound in the composition together with the polyamino compound. The monoamino compound can form a quaternary ammonium salt moiety in the carboxyl group-containing resin.

Preferably, the monoamino compound is a compound of which substituents binding to nitrogen are hydrogen, or an alkyl group or a hydroxyalkyl group having 1 to 6 carbon atoms. Especially preferred monoamino compounds are triethylamine, ammonia, n-butylamine, and diethylamine. The composition including one of such monoamino compounds becomes hydrophobic from hydrophilic swiftly and easily.

The content of the monoamino compound in the composition is preferably in the range of about 1 to about 40 parts by weight, more preferably in the range of about 3 to about 30 parts by weight, for 100 parts by weight of the carboxyl group-containing resin.

A-8. Colorant

The composition for forming the organic resin protection film preferably includes a colorant (i.e., a light-shading colorant). With the light-shading colorant included in the composition, the resultant organic resin protection film improves in the light-shading, and as a result a liquid crystal display device having excellent contrast is obtained. The light-shading colorant included in the composition may be a pigment or a dye, and may be dissolved or dispersed in the composition. The colorant may be dissolved or dispersed in water, hydrous alcohol, alcohol, hydrous ketone, and the like. The colorant is preferably a black pigment such as carbon black in the consideration of the light-shading. Specific examples of the pigment (organic black pigment) include CI-Acid Black Nos. 1, 2, 3, 24, 26, 30, 31, 33, 48, 50, 60 110, 112, and 207, and CI-Direct Black Nos. 5, 7, 19, 22, 51, 62, 112, 117, 118, 122, 154, 159, 169, and 173. Carbon black having a smaller diameter (e.g., in the range of 0.01 to 0.1 $\mu$m) is more preferable. The carbon black having a —COOM group on the surface (wherein M is one selected from the group consisting of hydrogen, ammonium, and alkali metals) is preferable. The formation of a —COOM group on the surface can be performed by conventional acid treatment. Such carbon black is excellent in the ink properties (dispersion stability, viscosity, and storage stability), the heat resistance, the oxidation resistance, the blackness, and the blackening.

The content of the colorant in the composition with respect to the resin is preferably about 5 to about 500 parts by weight for 100 parts by weight of the resin when the colorant is of the dispersion type. When the colorant is of the dissolving type, the content of the colorant may be smaller than that when it is of the dispersion type.

A-9. Preparation of composition for forming organic resin protection film

The composition for forming the organic resin protection film can be prepared by dissolving or dispersing the above-described components in water or an alcoholic solvent. Preferred solvents include water, ethanol, isopropanol, hydrous alcohol, and the like. The solvent is added preferably in the range of about 8 to about 250 parts by weight for 10 parts by weight of the resin. For example, the composition for forming the organic resin protection film may be prepared in the following manner. The carboxyl group-containing polymer (i.e., resin) is added to water or an alcoholic solvent containing an organic solvent such as acetone and methylethylketone as required. To the resultant mixture, ammonia or the amine compound and/or the polyamine compound are added to disperse or dissolve the polymer. Various known additives (e.g., a stabilizer and an antioxidant) may be added at any stage of the preparation as required. The components such as the colorant and the fluorine-containing compound may also be added at any stage of the preparation. The organic solvent such as acetone and methylethylketone contained as required can be removed by vacuum distillation and the like after the dispersion or dissolution of the components.

A-10. Formation of organic resin protection film

The composition for forming the organic resin protection film is applied to a desired portion of a substrate in a predetermined manner. Preferably, the composition is applied to the substrate so as to correspond to a pattern of non-pixel portions of a liquid crystal display device by any of a spin application method, an offset printing method, a screen printing method, a dispenser method, an ink jet method, a stencil printing method, an air knife application method, an applicator method, and the like. The composition applied to the substrate is heated to be dried and the hydrophilic composition is rendered hydrophobic. Thus, a water-repellent organic resin protection film is formed. The heat temperature is preferably in the range of about 50° C. to about 250° C., more preferably in the range of about 60° C. to about 150° C., most preferably in the range of about 80° C. to about 120° C.; however, it may vary depending on the identity of the resin contained in the composition. The heat time is preferably in the range of about 0.5 to about 50 minutes, more preferably in the range of about 1 to about 30 minutes, most preferably in the range of about 5 to about 15 minutes; however, it may vary depending on the heat temperature and the like. The heating is performed with a hot plate, an oven, an air dryer, or the like. The thickness of the resultant organic resin protection film is preferably in the range of about 0.8 to about 10 $\mu$m, more preferably in the range of about 1 to about 5 $\mu$m, most preferably in the range of about 2 to about 4 $\mu$m; however, it may vary depending on the use of the active matrix substrate. Such an organic resin protection film is formed at a predetermined stage in the fabrication process of an active matrix substrate to be described later.

B. Active matrix substrate

Embodiment 1

Figure 2:
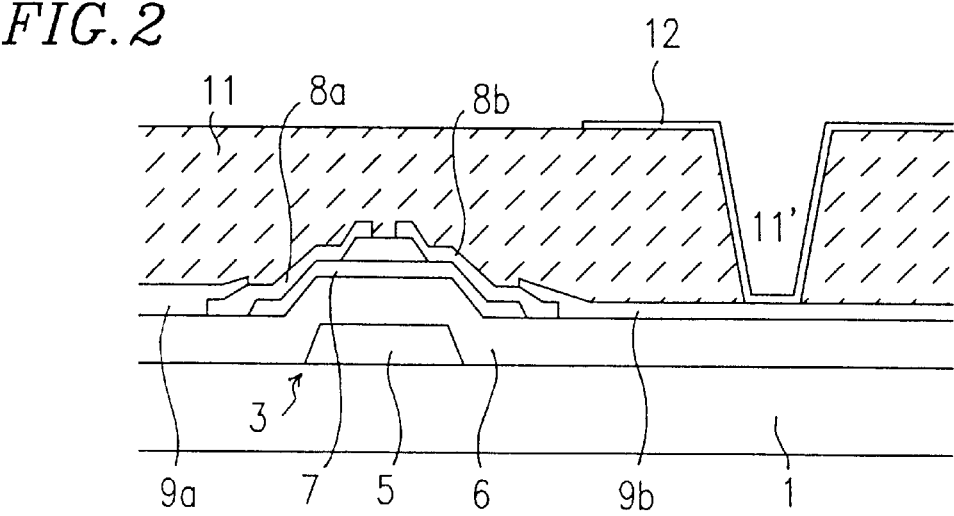
FIG. 2 is a sectional view taken along line II—II of FIG. 1.
Figure 3:
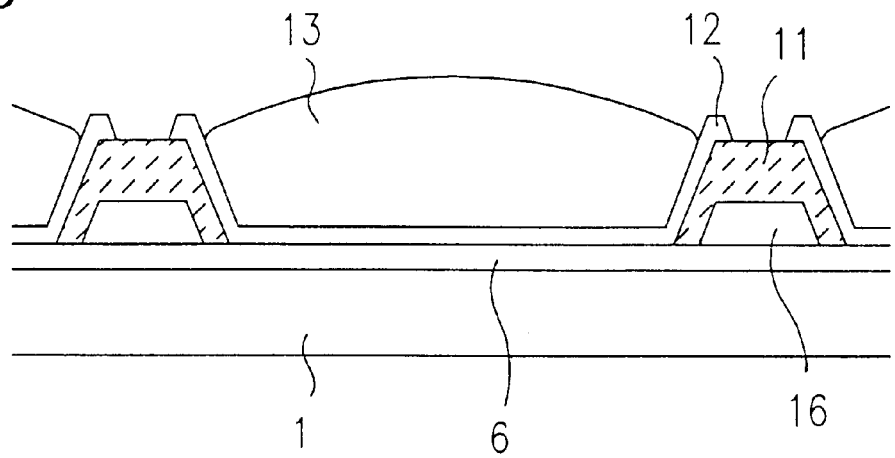
FIG. 3 is a sectional view taken along line III—III of FIG. 1, showing a preferred configuration of the color pixel portion of the active matrix substrate according to the present invention.

A preferred embodiment of the active matrix substrate according to the present invention n will be described with reference to FIGS. 1 to 3. FIG. 1 is a schematic partial plan view of a preferred embodiment of the active matrix substrate according to the present invention. FIGS. 2 and 3 are sectional views taken along line II—II and line III—III of FIG. 1, respectively.

Referring to FIG. 1, the active matrix substrate according to the present invention includes a plurality of gate bus lines 15 as scanning lines running parallel with one another and a plurality of source bus lines 16 as signal lines running parallel with one another to cross the gate bus lines 15 at right angles. The gate bus lines 15 and the source bus lines 16 are insulated from each other by an insulating film formed therebetween. A pixel electrode 12 is formed for each rectangular region surrounded by the adjacent gate bus lines 15 and the adjacent source bus lines 16, forming a matrix of the pixel electrodes 12 on the substrate. A branch extends from the gate bus line 15 at each region where the pixel electrode 12 is formed, to form a gate electrode 5 of a TFT 3 as a switching element. A water-repellent organic resin protection film 11 is formed to cover the TFTs 3, the gate bus lines 15, and the source bus lines 16.

Referring to FIG. 2, the active matrix substrate according to the present invention will be described in more detail. Each TFT 3 is essentially composed of the gate electrode 5 branching from the gate bus line 15, a gate insulating film 6 covering the gate electrode 5, a semiconductor layer 7 formed on the portion of the gate insulating film 6 corresponding to the gate electrode 5, an insulating film 10 formed on the semiconductor layer 7, contact layers 8a and 8b formed to cover the both sides of the insulating film 10 and the exposed portions of the semiconductor layer 7, and a source electrode 9a and a drain electrode 9b formed so as to overlap the contact layers 8a and 8b at edges, respectively. The gate electrode 5 is electrically connected with the gate bus line 15 and the source electrode 9a is electrically connected with the source bus line 16.

The water-repellent organic resin protection film 11 is formed to cover each TFT 3, and the pixel electrode 12 is formed to overlap the organic resin protection film 11. The pixel electrode 12 is electrically connected with the drain electrode 9b via a contact hole 11'.

Referring to FIG. 3, a color pixel portion 13 of the active matrix substrate of the present invention will be described. The color pixel portion 13 is composed of color ink applied to the region surrounded by the organic resin protection film 11 (i.e., a pixel portion). In this embodiment, the pixel electrode 12 is formed covering part of the organic resin protection film 11, and any of three types of R, G, and B color ink is applied to the pixel electrode 12 according to a predetermined arrangement. In this way, the color pixel portions 13 (i.e., a color filter) are directly formed on the substrate 1 without the necessity of fabricating a color filter separately from the active matrix substrate.

Embodiment 2

Figure 4:
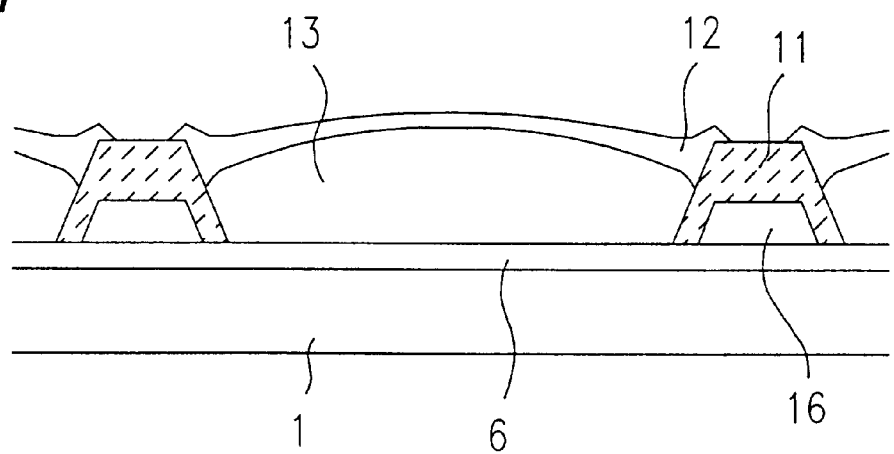
FIG. 4 is a sectional view taken along line III—III of FIG. 1, showing another preferred configuration of the color pixel portion of the active matrix substrate according to the present invention.

The color pixel portion 13 of the active matrix substrate according to the present invention may also have a configuration as shown in FIG. 4. Referring to FIG. 4, any of three types of R, G, and B color ink is applied to the region on the gate insulating film 6 surrounded by the organic resin protection film 11 according to a predetermined arrangement. The pixel electrode 12 is then formed covering the color ink and part of the organic resin protection film 11. The pixel electrode 12 is formed to bury the contact hole 11', though not shown, to electrically contact with the drain electrode 9b.

Hereinbelow, referring to FIGS. 5A to 5I, a preferred method for fabricating such an active matrix substrate will be described.

Figure 5A:
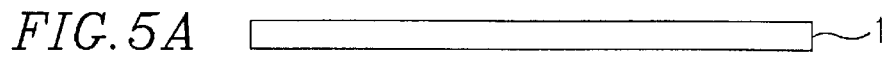
FIGS. 5A to 5I are schematic sectional views illustrating the steps of fabricating the active matrix substrate according to the present invention.

A substrate 1 as shown in FIG. 5A is preferably made of a transparent solid material such as glass and plastic. The thickness of the substrate 1 is preferably in the range of 0.5 to 1 mm.

Figure 5B:
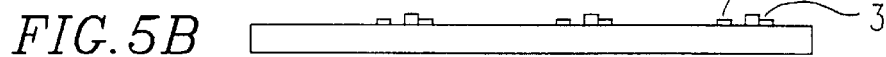

As shown in FIG. 5B, the TFTs 3, the source bus lines 16, and the gate bus lines 15 (not shown in this figure) are formed on the substrate 1 in the following manner.

First, metal for the gate bus lines 15 is deposited by sputtering, electron beam evaporation, or the like, and patterned into a predetermined shape by photolithography, etching, and the like, to form the plurality of parallel gate bus lines 15 and the gate electrodes 5 branched from the gate bus lines 15. Examples of such metal include tantalum (Ta), titanium (Ti), aluminum (Al), and chromium (Cr). The thickness of the deposited metal is preferably in the range of 0.1 to 0.6 $\mu$m.

Then, the gate insulating film 6 made of $SiN_x$, $SiO_x$, or the like is formed by plasma CVD or the like over the entire surface of the glass substrate with the gate bus lines 15 and the gate electrodes 5 formed thereon. The thickness of the gate insulating film 6 is preferably in the range of 0.1 to 0.6 $\mu$m.

The semiconductor layers 7 made of non-doped amorphous silicon (a-Si) or the like is then formed on the gate insulating film 6 by plasma CVD or the like. The thickness of the semiconductor layers 7 is preferably in the range of 0.02 to 0.04 $\mu$m. Thereafter, $SiN_x$ is deposited on the semiconductor layers 7 by plasma CVD, for example, and patterned so as to leave the $SiN_x$ only above the top portions of the gate electrodes 5 unremoved, to form the insulating films 10. The thickness of the insulating films 10 is preferably in the range of 0.01 to 0.03 $\mu$m.

A contact layer 8 is then formed on the insulating films 10 for the purpose of improving ohmic contact between the semiconductor layers 7 and the source and drain electrodes 9a and 9b to be formed in a subsequent step. For example, amorphous silicon doped with phosphorus (P) ($n^+$-type a-Si) is deposited on the insulating films 10 by plasma CVD or the like and patterned into a predetermined shape by etching or the like. (The semiconductor layers 7 are simultaneously patterned into a predetermined shape.) The thickness of the contact layer 8 is preferably in the range of 0.03 to 0.06 $\mu$m.

The source and drain electrodes 9a and 9b and the source bus lines 16 are then formed simultaneously. For example, titanium (Ti), aluminum (Al), molybdenum (Mo), chromium (Cr), or the like is deposited over the resultant substrate by sputtering or the like, and patterned into a predetermined shape by etching or the like. Unnecessary portions of the contact layer 8 are simultaneously removed at this patterning to form the contact layers 8a connected with the source electrodes 9a and the contact layers 8b connected with the drain electrodes 9b. Thus, the TFTs 3 are formed.

Figure 5C:
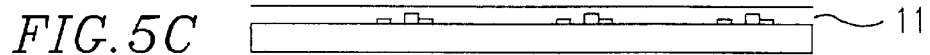

Thereafter, as shown in FIG. 5C, the composition for forming the organic resin protection film as described above is applied to the resultant substrate including the TFTs 3 and the like, and heated to form the organic resin protection film 11. The composition for forming the hydrophilic organic resin protection film is rendered hydrophobic by heating, forming the water-repellent organic resin protection film. The detailed conditions at the formation of the organic resin protection film are as described in clause A-10 above.

Figure 5D:
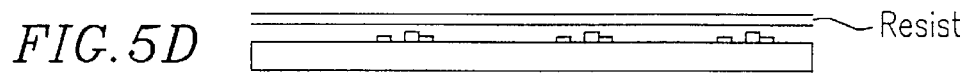
Figure 5E:
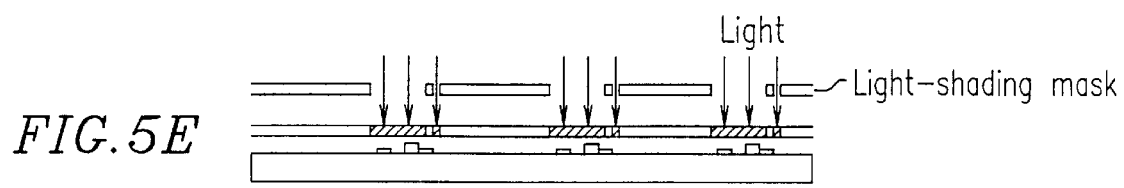
Figure 5F:

A resist is then applied to the resultant substrate as shown in FIG. 5D, and irradiated with light via a light-shading mask as shown in FIG. 5E, to pattern the organic resin protection film into a predetermined shape by etching and the like. At this patterning, the contact holes 11' are also formed as shown in FIG. 5F, to allow the pixel electrodes 12 to be formed at a later step to be electrically connected with the drain electrodes 9b.

The organic resin protection film 11 may be formed by heating the composition for forming the organic resin protection film applied to the substrate to dry and render hydrophobic and then patterning into a predetermined shape as described above. Alternatively, it may be formed by applying the composition to the substrate in a predetermined pattern and then heating the patterned composition to dry and render hydrophobic.

Figure 5G:
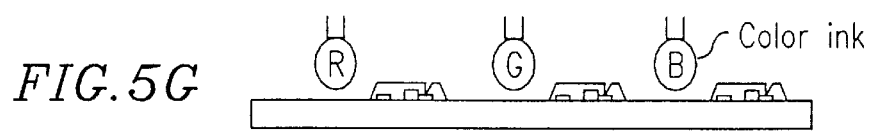
Figure 5H:
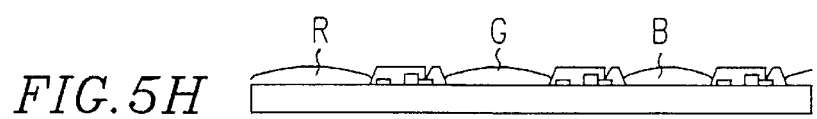

Thereafter, as shown in FIG. 5G, three types of hydrophilic R, G, and B color ink are applied to respective predetermined regions of the substrate surrounded by the pattern of the organic resin protection film 11. The color ink is not specifically limited, but any ink generally used for color filters and the like may be used. Such color ink is typically an aqueous dispersion containing a pigment, a binder resin (e.g., melamine resin), a curing agent, and a surfactant. The color ink can be applied to the substrate by a printing method, an ink jet method, or the like. The ink jet method is preferred due to the following reason. The hydrophilic color ink injected by the ink jet method is more effectively prevented from attaching to the water-repellent organic resin protection film due to the offset effect. This effectively prevents the three colors (R, G, and B) from being mixed with one another, and as a result, markedly improves the precision, the stability, and the easiness in the fabrication of the active matrix substrate. Thus, the color pixel portions 13 are formed as shown in FIG. 5H.

Figure 5I:
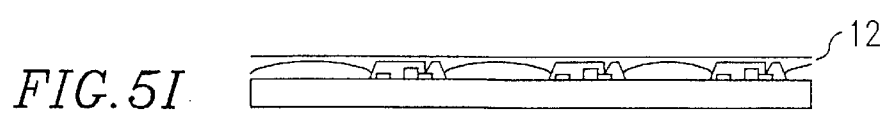

Then, as shown in FIG. 5I, the pixel electrodes 12 made of ITO (indium tin oxide), SnO, or the like are formed on the resultant substrate. The thickness of the pixel electrodes 12 is preferably in the range of 0.06 to 0.1 $\mu$m. Since the contact holes 11' are formed, the pixel electrodes 12 are electrically connected with the drain electrodes 9b via the contact holes 11'. Thus, the active matrix substrate is fabricated.

Embodiment 3

Figure 6:
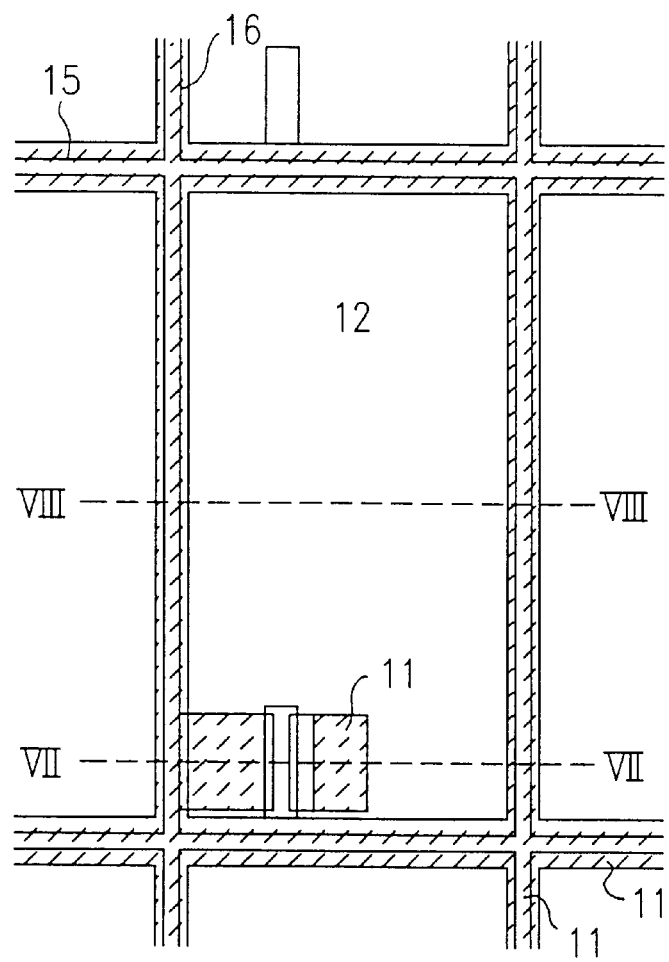
FIG. 6 is a schematic plan view of one color pixel portion of another preferred embodiment of the active matrix substrate according to the present invention.
Figure 7:
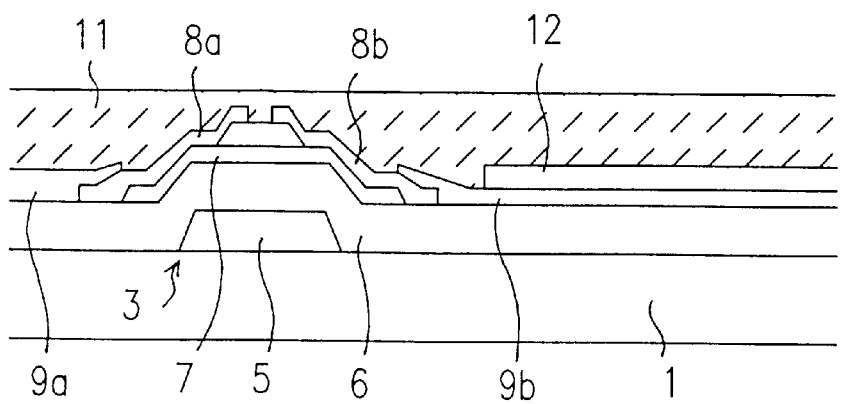
FIG. 7 is a sectional view taken along line VII—VII of FIG. 6.
Figure 8:
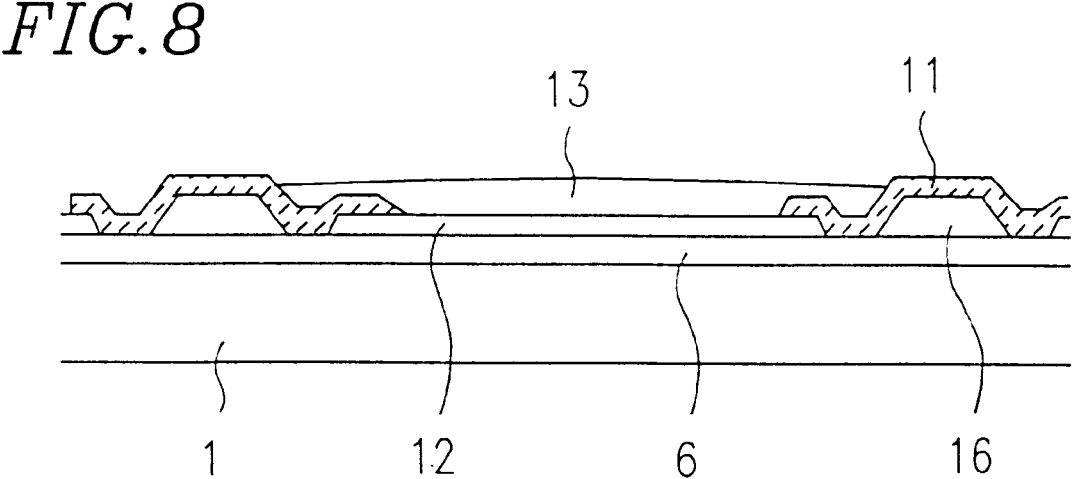
FIG. 8 is a sectional view taken along line VIII—VIII of FIG. 6.

Yet another preferred embodiment of the active matrix substrate according to the present invention will be described with reference to FIGS. 6 to 8. FIG. 6 is a schematic partial plan view of yet another preferred embodiment of the active matrix substrate according to the present invention. FIGS. 7 and 8 are sectional views taken along line VII—VII and line VIII—VIII of FIG. 6.

Referring to FIG. 6, the active matrix substrate according to the present invention includes a plurality of gate bus lines 15 as scanning lines running parallel with one another and a plurality of source bus lines 16 as signal lines running parallel with one another to cross the gate bus lines 15 at right angles. The gate bus lines 15 and the source bus lines 16 are insulated from each other by an insulating film formed therebetween. A pixel electrode 12 is formed for each rectangular region surrounded by the adjacent gate bus lines 15 and the adjacent source bus lines 16, forming a matrix of the pixel electrodes 12 on the substrate. A branch extends from the gate bus line 15 in each region where the pixel electrode 12 is formed to form a gate electrode 5 of a TFT 3 as a switching element. A water-repellent organic resin protection film 11 is formed to cover the TFTs 3, the gate bus lines 15, and the source bus lines 16.

Referring to FIG. 7, the active matrix substrate according to the present invention will be described in more detail. Each TFT 3 is essentially composed of the gate electrode 5 branching from the gate bus line 15, a gate insulating film 6 covering the gate electrode 5, a semiconductor layer 7 formed on the portion of the gate insulating film 6 corresponding to the gate electrode 5, an insulating film 10 formed on the semiconductor layer 7, contact layers 8a and 8b formed to cover the both sides of the insulating film 10 and the exposed portions of the semiconductor layer 7, and a source electrode 9a and a drain electrode 9b formed so as to overlap the contact layers 8a and 8b at edges, respectively. A pixel electrode 12 is formed to overlap part of the drain electrode 9b, and the water-repellent organic resin protection film 11 is formed covering the TFT 3 and part of the pixel electrode 12.

Referring to FIG. 8, a color pixel portion 13 will be described. The pixel electrode 12 is formed in the region surrounded by the adjacent source bus lines 16 and the adjacent gate bus lines 15, and the organic resin protection film 11 is formed covering the gate bus lines 15, the source bus lines 16, and part of the pixel electrode 12. One of three types of R, G, and B color ink is applied to the region of the substrate surrounded by the organic resin protection film 11 according to a predetermined arrangement to form the color pixel portion 13. Thus, the color pixel portion 13 (i.e., a color filter) is directly formed on the substrate 1 without the necessity of fabricating a color filter separately from the active matrix substrate.

C. Liquid crystal display device

Figure 9:
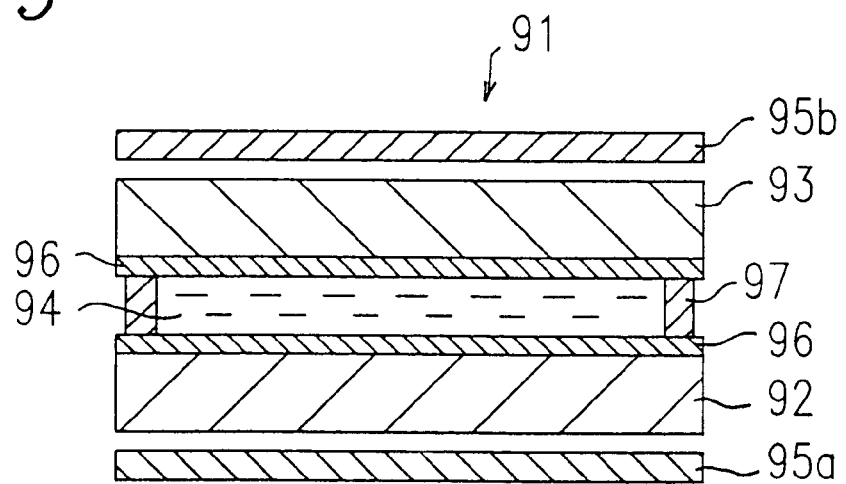
FIG. 9 is a schematic sectional view of a liquid crystal display panel used for a liquid crystal display device according to the present invention.

A transparent type liquid crystal display device as a preferred embodiment of the liquid crystal display device according to the present invention will be described with reference to FIG. 9. FIG. 9 is a schematic sectional view of a liquid crystal display panel 91 used for the liquid crystal display device.

The liquid crystal display panel 91 includes an active matrix substrate 92 having the configuration described above, a counter substrate 93 having a counter electrode, and a liquid crystal layer 94 as a display medium interposed between the substrates 92 and 93. The substrates 92 and 93 with the liquid crystal layer 94 therebetween are attached together along the peripheries with a sealant 97. Polarizing plates 95a and 95b are formed on the outer surfaces of the substrates 92 and 93.

Alignment films 96 of a predetermined thickness made of a polyimide resin or the like are formed on the inner surfaces of the substrates 92 and 93 facing the liquid crystal layer 94. The alignment films 96 are subjected to an alignment treatment (for example, rubbing treatment) so that liquid crystal molecules in the liquid crystal layer 94 are in a predetermined alignment (e.g., twisted nematic (TN) alignment and super twisted nematic (STN) alignment).

As the liquid crystal material for the liquid crystal layer 94, a known organic mixture which exhibits liquid crystal behavior at and around normal temperature may be used. Types of such a liquid crystal material include nematic liquid crystal, cholesteric liquid crystal, smectic liquid crystal, ferroelectric liquid crystal, and discotic liquid crystal. These liquid crystal materials may be used alone or as a mixture thereof. Any mode which utilizes birefringence and polarization, such as TN, STN, ECB, and FLC modes may be used as the operation mode for driving the liquid crystal.

In the liquid crystal display device including the liquid crystal display panel 91 with the above configuration, the transmittance of the liquid crystal changes in response to an image signal supplied to each pixel electrode formed on the substrate. This modulates light incident from a backlight (not shown) during the transmission of the light through the liquid crystal layer 94, resulting in the display of a color image. The liquid crystal display device according to the present invention effects the display of color images without the necessity of providing a separate color filter because the active matrix substrate 92 serves as the color filter as described above.

D. Function

According to the present invention, the composition for forming the organic resin protection film of the active matrix substrate includes the resin having the quaternary ammonium monomer unit having the quaternary ammonium salt moiety of a specific molecular structure. The cation portion of the quaternary ammonium salt moiety is easily converted to ammonia or amine (primary amine, secondary amine, or tertiary amine) by normal heating. Ammonia and amine also easily volatilize by heating. Utilizing such characteristics of the ammonium salt moiety, it is possible to easily render the hydrophilic moiety of the resin in the composition for forming the organic resin protection film (the quaternary ammonium salt moiety, i.e., —COO$^-$X$^+$) hydrophobic (i.e., —COOH). The composition for forming the organic resin protection film therefore becomes hydrophobic from hydrophilic. As a result, the water-repellent organic resin protection film is obtained.

This feature of the present invention that the composition for forming the organic resin protection film easily becomes hydrophobic from hydrophilic provides the following advantages:

(1) The protection film of the active matrix substrate can be formed merely by normal drying and heating, eliminating the necessity of conducting a vacuum process such as CVD required for the formation of a conventional protection film. This greatly simplifies the fabrication process of the active matrix substrate and thus the liquid crystal display device.

(2) The composition applied to the substrate in the process for forming the organic resin protection film exhibits significantly high adhesion (i.e., high hydrophilicity) with the substrate. This reduces undesirable separation of the resultant organic resin protection film from the substrate in the subsequent fabrication process of the liquid crystal display device. As a result, the liquid crystal display device can be fabricated with significantly high yield.

Moreover, the composition easily becomes hydrophobic from hydrophilic to provide the water-repellent organic resin protection film which effectively repels color ink. Accordingly, no color blur or color mixture of the color ink occurs in the color pixel portions (i.e., the color filter). As a result, an active matrix substrate and thus a liquid crystal display device having excellent color display performance can be obtained.

(3) Since the color ink can be easily applied to the active matrix substrate without causing color blur, a separate color filter is not required. A photolithographic process for each of R, G, and B colors is not required, either. As a result, an active matrix substrate and thus a liquid crystal display device having a high aperture ratio can be obtained at extremely low cost.

(4) Since the blur of the color ink can be effectively prevented, it is possible to apply the color ink to the edges and corners of each pixel which otherwise cannot be applied with the color ink by a conventional method. This allows the area of the organic resin protection film to be minimized, while the area of the pixel electrode to be maximized. As a result, a bright liquid crystal display device having a high aperture ratio can be obtained.

(5) In the case where a water-repellent black organic resin protection film is formed from a composition containing carbon black, the active matrix substrate according to the present invention does not need a margin for an alignment error, which is conventionally required for a display device where a light-shading film corresponding to the water-repellent organic resin protection film is formed on a counter substrate. This minimizes the area of the light-shading film while maximizing the area of the color pixel portion.

Examples

Hereinbelow, the present invention will be described by illustrative but by no means restrictive examples as follows. In these examples, the "parts" and "%" are by weight unless otherwise specified.

First, the preparation of the composition for forming the organic resin protection film and the color ink constituting the color pixel portions of the active matrix substrate according to the present invention will be specifically described.

Production Example 1

Preparation of composition for forming organic resin protection film

A hundred grams of 40% acetone solution of a styrene-maleic anhydride monoethyl ester copolymer (molar ratio 1:1) was gradually added to an aqueous solution of 15 cc of 30% ammonia water and 185 cc of pure water while being agitated. The mixed solution was heated to 40–45° C. to react until the scent of ammonia could not be detected. After completion of the reaction, acetone was removed by vacuum distillation to obtain uniform aqueous composition. The copolymer resin included in the composition has a styrene monomer unit as a monomer unit A, a maleic acid monomer unit as a monomer unit B, and a bivalent ammonium cation as a quaternary ammonium salt moiety as shown in Table 1 below.

TABLE 1

| Production Example | A | B | $X^+$ | A:B (molar ratio) |
|---|---|---|---|---|
| 1 | styrene | $C_2H_2(COO^-)_2$ | ammonium ion (bivalent) | 1:1 |
| 2 | styrene | $C_2H_2(COO^-)$ $(COOCH_2CF_3)$ | ammonium ion | 1:1 |
| 3 | styrene | $C_2H_2(COO^-)$ $(COOCH_2CF_3)$ | triethyl ammonium ion | 1:2 |
| 4 | styrene | $C_2H_2(COO^-)$ $(COOCH_2C_2F_5)$ | ammonium ion | 1:3 |
| 5 | vinyl acetate | $C_2H_2(COO^-)_2$ | ammonium ion (bivalent) | 1:1 |
| 6 | vinyl acetate | $C_2H_2(COO^-)$ $(COOCH_2CF_3)$ | triethyl ammonium ion | 1:2 |
| 7 | styrene | $C_2H_2(COO^-)_2$ | $CH_2(NH_2)_2$ (bivalent) | 1:2 |

Production Examples 2–7

Preparation of composition for forming an organic resin protection film

The compositions for the respective production examples were prepared in the same manner as that described in Production Example 1, except that each of the copolymer resins has the monomer unit A, the monomer unit B, and the quaternary ammonium salt moiety as listed in Table 1 above.

Production Example 8

Preparation of composition for forming organic resin protection film

Ten grams of carbon black (MA-100, manufactured by Mitsubishi Carbon Co. Ltd.) were added to 100 g of a 40% methylethylketone solution of a styrene-$C_2H_2(COO^-)$ $(COOCH_2CF_3)NH_4^+$ copolymer (molar ratio 5:1). This mixture was vibrated with a paint conditioner for 30 minutes, to obtain a dispersion with the carbon black finely dispersed therein. While being agitated, the dispersion was gradually added to a solution with 3.0 g of triethyleamine dissolved in 250 g of pure water. Then, the solution with the dispersion added thereto was heated to 80° C. to react for about one hour. After completion of the reaction, methylethylketone was removed by vacuum distillation to obtain aqueous dispersion type black ink (i.e., the composition for forming the organic resin protection film). The viscosity of the resultant composition was 400 cp (at 30° C.).

Production Example 9

Preparation of color ink

Three types of red, green, and blue color ink were prepared in the following manner.

(A) Five parts of a red pigment (PR177), 5 parts of a surfactant (Newcall 710F, manufactured by Nippon Nyukazai Co., Ltd.), 10 parts of a melamine resin (Sumitex Resin M-3, manufactured by Sumitomo Chemical Co., Ltd.), one part of a curing agent (Sumitex Accelerator ACX, manufactured by Sumitomo Chemical Co., Ltd.), and 89 parts of water were mixed. The mixture was vibrated with a paint conditioner for one hour at room temperature, to finely disperse the pigment. Thus, red ink was prepared.

(B) Green ink was prepared by the same process as process (A) except that a green pigment (PG-36) was used in place of the red pigment (PR177).

(C) Blue ink was prepared by the same process as process (A) except that a blue pigment (PB-15) was used in place of the red pigment (PR177).

Example 1

Tantalum was deposited to a thickness of 0.5 μm on a glass substrate with a thickness of 1.1 mm, and patterned by photolithography and etching to form a plurality of parallel gate bus lines and gate electrodes branched from the gate bus lines. Then, $SiN_x$ was deposited to a thickness of 0.5 μm on the entire surface of the glass substrate with the gate bus lines and the gate electrodes formed thereon, to form a gate insulating film. Then, non-doped amorphous silicon (a-Si) was deposited to a thickness of 0.03 μm on the gate insulating film to form semiconductor layers. Thereafter, $SiN_x$ was deposited to a thickness of 0.02 μm and patterned so as to leave the $SiN_x$ only above the top portions of the gate electrodes unremoved, to form insulating films. Amorphous silicon doped with phosphorus (P) ($n^+$-type a-Si) was deposited to a thickness of 0.045 μm over the entire surface of the resultant substrate, to form a contact layer. Thereafter, titanium was deposited to a thickness of 0.2 μm by sputtering over the entire surface of the substrate including the contact layer, and patterned into a predetermined shape by etching to form source and drain electrodes and source bus lines simultaneously. At this time, unnecessary portions of the contact layer were simultaneously removed to form contact layers connected with the source electrodes and other contact layers connected with the drain electrodes. Thus, TFTs 3 are formed on the substrate.

Thereafter, the composition for forming the organic resin protection film prepared in Production Example 1 was applied to the resultant substrate to a thickness of 3 μm by a spin application method. The resultant substrate was then placed on a hot plate with the side of the substrate where the composition was not applied facing the hot plate, and heated at about 100° C. for about five minutes, to dry the composition and render the hydrophilic composition hydrophobic. Thus, the water-repellent organic resin protection film was formed.

A resist was then applied to the resultant substrate having the organic resin protection film formed thereon, irradiated with light via a light-shading mask, and etched to pattern the organic resin protection film into a predetermined shape (i.e., so that the organic resin protection film would cover the TFTs, the source bus lines, and the gate bus lines). At this patterning, contact holes were also formed. Then, ITO was deposited to a thickness of 0.08 μm by sputtering on the entire surface of the resultant substrate including the contact holes. The ITO film was patterned into a predetermined shape to form pixel electrodes arranged in a matrix so as to be electrically connected with the drain electrodes of the TFTs.

The three types of R, G, and B color ink prepared in Production Example 9 were then applied to respective predetermined regions of the substrate where the organic resin protection film was not formed using an ink jet apparatus (trial-manufactured by the Sharp Kabushiki Kaisha). Thus, R, G, and B pixels were formed on predetermined positions on the substrate. These pixels were cured at 120° C. for 10 minutes to form color pixel portions (i.e., a color filter). The thickness of each pixel after cured was 2.4 μm. The active matrix substrate as shown in FIGS. 1 to 3 was thus fabricated.

The reflection infrared absorption of the organic resin protection film of the active matrix substrate fabricated in the above-described manner was measured. As a result, the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted to a carboxylic group (i.e., —COOH), rendering the hydrophilic composition hydrophobic to provide a water-repellent organic resin protection film. It was further observed that the organic resin protection film had not been peeled off from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of the active matrix substrate fabricated in the above-described manner was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Examples 2 to 6

Active matrix substrates of Examples 2 to 6 were fabricated in the same manner as that described in Example 1, except that the compositions for forming the organic resin protection film prepared in Production Examples 2 to 6, respectively, were used. The resultant organic resin protection films and color pixel portions were observed as in Example 1.

The reflection infrared absorption of each organic resin protection film was measured, and the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted to a carboxylic group (i.e., —COOH), rendering the hydrophilic composition hydrophobic to provide a water-repellent organic resin protection film. It was further observed that the organic resin protection film had not separated from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of each active matrix substrate was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Example 7

An active matrix substrate of Example 7 was fabricated in the same manner as that described in Example 1, except that the composition for forming the organic resin protection film prepared in Production Example 7 was used and that the composition was applied to the substrate by the offset printing method. The resultant organic resin protection film and color pixel portion were observed as in Example 1.

The reflection infrared absorption of the organic resin protection film was measured, and the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted to a carboxylic group (i.e., —COOH), rendering the hydrophilic composition hydrophobic to provide a water-repellent organic resin protection film. It was further observed that the organic resin protection film had not been peeled off from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of the active matrix substrate was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Example 8

An alignment film made of a polyimide resin with a thickness of 0.08 μm was formed on the active matrix substrate fabricated in Example 1 by the offset printing method and subjected to an alignment treatment. A counter substrate was fabricated by forming an ITO film with a thickness of 0.08 μm on the entire surface of a glass substrate with a thickness of 1.1 mm. An alignment film made of a polyimide resin with a thickness of 0.08 μm was also formed on the resultant counter substrate by the offset printing method and subjected to an alignment treatment. These alignment films were subjected to an alignment treatment so that liquid crystal to be contained between the substrates when these substrates are attached together was aligned in a predetermined alignment. The active matrix substrate and the counter substrate were attached together with a space therebetween, and liquid crystal was injected into the space by a known method. Polarizing plates were disposed on the outer surfaces of the attached substrates. Thus, a liquid crystal display device was fabricated. The display quality of this liquid crystal display device was examined.

Since the pixel electrodes were formed over the entire surface of the active matrix substrate (i.e., also over the TFTs, the source bus lines, and the gate bus lines), the resultant liquid crystal display device attained such a high aperture ratio that had never been realized by conventional liquid crystal display devices, thereby providing very bright display images. Further, since no color blur or color mixture was observed in the color pixel portions of the active matrix substrate, the color display performance of the resultant liquid crystal display device was excellent. Moreover, using the inexpensive active matrix substrate, the resultant liquid crystal display device could be fabricated at lower cost compared with conventional devices.

Examples 9 to 14

Liquid crystal display devices of Examples 9 to 14 were fabricated in the same manner as that described in Example 8, except that the active matrix substrates fabricated in Examples 2 to 7 were used, respectively. The display quality of each resultant liquid crystal display device was examined as in Example 8.

Since the pixel electrodes of each active matrix substrate were formed over the entire surface of each of the active matrix substrates (i.e., also over the TFTs, the source bus lines, and the gate bus lines), the resultant liquid crystal display device attained such a high aperture ratio that had never been realized by conventional liquid crystal display devices, thereby providing very bright display images. Further, since no color blur or color mixture was observed in the color pixel portions of the active matrix substrate, the color display performance of the resultant liquid crystal display device was excellent. Moreover, using the inexpensive active matrix substrate, the resultant liquid crystal display device could be fabricated at lower cost compared with conventional devices.

Example 15

TFTs were formed on a substrate in the procedure as described in Example 1. The composition prepared in Production Example 1 was applied to the substrate including the TFTs to a thickness of 3 μm by the spin application method. The resultant substrate was then placed on a hot plate with the side of the substrate where the composition was not applied facing the hot plate, and heated at about 100° C. for about five minutes, to dry the composition and render the hydrophilic composition hydrophobic. Thus, a water-repellent organic resin protection film was formed.

A resist was then applied to the resultant substrate having the organic resin protection film formed thereon, irradiated with light via a light-shading mask, and etched to pattern the organic resin protection film into a predetermined shape (i.e., so that the organic resin protection film would cover the TFTs, the source bus lines, and the gate bus lines). At this patterning, contact holes were also formed. Then, the three types of R, G, and B color ink prepared in Production Example 9 were applied to respective predetermined regions of the substrate where the organic resin protection film was not formed using an ink jet apparatus (trial-manufactured by the Sharp Kabushiki Kaisha). Thus, R, G, and B pixels were formed on predetermined positions of the substrate. These pixels were cured at 120° C. for 10 minutes to form the color pixel portions (i.e., a color filter). The thickness of each pixel after cured was 2.4 μm.

Thereafter, ITO was deposited to a thickness of 0.08 μm by sputtering on the entire surface of the resultant substrate including the color pixel portion. The ITO film was patterned into a predetermined shape to form pixel electrodes arranged in a matrix so as to be electrically connected with drain electrodes of the TFTs. The active matrix substrate as shown in FIG. 4 was thus fabricated.

The reflection infrared absorption of the organic resin protection film of the active matrix substrate fabricated in the above-described manner was measured. As a result, the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted to a carboxylic group (i.e., —COOH), rendering the hydrophilic composition hydrophobic to provide a water-repellent organic resin protection film. It was further observed that the organic resin protection film had not been peeled off from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of the active matrix substrate fabricated in the above-described manner was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Examples 16 to 20

Active matrix substrates of Examples 16 to 20 were fabricated in the same manner as that described in Example 15, except that the compositions for forming the organic resin protection film prepared in Production Examples 2 to 6, respectively, were used. The resultant organic resin protection films and color pixel portions were observed as in Example 15.

The reflection infrared absorption of each organic resin protection film was measured, and the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted into a carboxylic group (i.e., —COOH), rendering the hydrophilic composition hydrophobic to provide a water-repellent organic resin protection film. It was further observed that the organic resin protection film had not separated from the substrate through a series of fabrication steps (e.g., evaporation of ITO, application of polyimide, baking, rubbing, and cleaning) of the liquid crystal display device after the formation of the film, confirming that the organic resin protection film had excellent adhesion with the substrate.

The color pixel portions (the color filter) of each active matrix substrate was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Example 21

An active matrix substrate of Example 21 was fabricated in the same manner as that described in Example 15, except that the composition for forming an organic resin protection film prepared in Production Example 7 was used and that the composition was applied to the substrate by the offset printing method. The resultant organic resin protection film and color pixel portion were observed as in Example 1.

The reflection infrared absorption of the organic resin protection film was measured, and the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted into a carboxylic group (i.e., —COOH), rendering the hydrophilic composition hydrophobic to provide a water-repellent organic resin protection film. It was further observed that the organic resin protection film had not separated from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of the active matrix substrate was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Examples 22 to 28

Liquid crystal display devices of Examples 22 to 28 were fabricated in the same manner as that described in Example 8, except that the active matrix substrates fabricated in Examples 15 to 21 were used, respectively. The display quality of each resultant liquid crystal display device was examined as in Example 8.

Since the pixel electrodes were formed over the entire surface of the active matrix substrate (i.e., also over the TFTs, the source bus lines, and the gate bus lines), the resultant liquid crystal display device attained such a high aperture ratio that had never been realized by conventional liquid crystal display devices, thereby providing very bright display images. Further, since no color blur or color mixture was observed in the color pixel portions of the active matrix substrate, the color display performance of the resultant liquid crystal display device was excellent. Moreover, using the inexpensive active matrix substrate, the resultant liquid crystal display device could be fabricated at lower cost compared with conventional devices.

Example 29

TFTs were formed on a substrate in the procedure as described in Example 1. An ITO film with a thickness of 0.08 μm was formed on the substrate including the TFTs by sputtering, and then patterned into a predetermined shape to form pixel electrodes arranged in a matrix so as to be electrically connected with drain electrodes of the TFTs.

The composition prepared in Production Example 1 was then applied to the resultant substrate to a thickness of 3 μm by the spin application method. The resultant substrate was then placed on a hot plate with the side of the substrate where the composition was not applied facing the hot plate, and heated at about 100° C. for about five minutes, to dry the composition and render the hydrophilic composition hydrophobic. Thus, a water-repellent organic resin protection film was formed.

A resist was then applied to the resultant substrate including the organic resin protection film formed thereon, irradiated with light via a light-shading mask, and etched to pattern the organic resin protection film into a predetermined shape (i.e., so that the organic resin protection film would cover the TFTs, source bus lines, gate bus lines, and a part of the pixel electrodes). At this patterning, contact holes were also formed. Then, the three types of R, G, and B color ink prepared in Production Example 9 were applied to respective predetermined regions of the substrate where the organic resin protection film was not formed using an ink jet apparatus (trial-manufactured by the Sharp Kabushiki Kaisha). Thus, R, G, and B pixels were formed on predetermined positions of the substrate. These pixels were cured at 120° C. for 10 minutes to form color pixel portions (i.e., a color filter). The thickness of each pixel after cured was 2.4 μm. Thus, the active matrix substrate as shown in FIGS. 6, 7, and 8 was fabricated.

The reflection infrared absorption of the organic resin protection film of the active matrix substrate fabricated in the above-described manner was measured. As a result, the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted to a carboxylic group (i.e., —COOH), rendering the hydrophilic composition hydrophobic to provide a water-repellent organic resin protection film. It was further observed that the organic resin protection film had not been peeled off from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of the active matrix substrate fabricated in the above-described manner was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Examples 30 to 34

Active matrix substrates of Examples 30 to 34 were fabricated in the same manner as that described in Example 29, except that the compositions for forming an organic resin protection film prepared in Production Examples 2 to 6, respectively, were used. The resultant organic resin protection films and color pixel portions were observed as in Example 29.

The reflection infrared absorption of each organic resin protection film was measured, and the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted into a carboxylic group (i.e., —COOH), rendering the hydrophilic composition hydrophobic to provide a water-repellent organic resin protection film. It was further observed that the organic resin protection film had not separated from the substrate through a series of fabrication steps (e.g., evaporation of ITO, application of polyimide, baking, rubbing, and cleaning) of the liquid crystal display device after the formation of the film, confirming that the organic resin protection film had excellent adhesion with the substrate.

The color pixel portions (the color filter) of each active matrix substrate was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Example 35

An active matrix substrate of Example 35 was fabricated in the same manner as that described in Example 29, except that the composition for forming the organic resin protection film prepared in Production Example 7 was used and that the composition was applied to the substrate by the offset printing method. The resultant organic resin protection film and color pixel portion were observed as in Example 29.

The reflection infrared absorption of the organic resin protection film was measured, and the absorption at a band around 1700 cm$^{-1}$ which is specific to carboxylic acid was observed. This indicates that the quaternary ammonium salt moiety (i.e., —COO$^-$X$^+$) of the copolymer included in the composition for forming the organic resin protection film was converted into a carboxylic group (i.e., —COOH), rendering the hydrophilic composition hydrophobic to provide a water-repellent organic resin protection film. It was further observed that the organic resin protection film had not been peeled off from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of the active matrix substrate was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Examples 36 to 42

Liquid crystal display devices of Examples 36 to 42 were fabricated in the same manner as that described in Example 8, except that the active matrix substrates fabricated in Examples 29 to 35 were used, respectively. The display quality of each resultant liquid crystal display device was examined as in Example 8.

The resultant liquid crystal display devices provided very bright display images. Further, since no color blur or color mixture was observed in the color pixel portions of the active matrix substrate, the color display performance of the resultant liquid crystal display device was excellent. Moreover, using the inexpensive active matrix substrate, the resultant liquid crystal display device could be fabricated at lower cost compared with conventional devices.

Example 43

An active matrix substrate of Example 43 was fabricated in the same manner as that described in Example 1, except that the composition for forming the organic resin protection film prepared in Production Example 8 was used. The resultant organic resin protection film and color pixel portion were observed as in Example 1.

The reflection infrared absorption of the organic resin protection film was measured, and the absorption at a band around 1700 cm$^-$which is specific to carboxylic acid was observed. This indicates that the quaternary ammonium salt moiety (i.e., —COO$^-$X$^+$) of the copolymer included in the composition for forming the organic resin protection film was converted into a carboxylic group (i.e., —COOH), rendering the hydrophilic composition hydrophobic to provide a water-repellent organic resin protection film. It was further observed that the organic resin protection film had not been peeled off from the substrate through a series of fabrication steps (e.g., evaporation of ITO, application of polyimide, baking, rubbing, and cleaning) of the liquid crystal display device after the formation of the protection film, confirming that the organic resin protection film had excellent adhesion with the substrate.

The color pixel portions (the color filter) of the active matrix substrate was observed with an optical microscope and found to be free from color blur, color mixture, or color difference variation. Since the active matrix substrate neither required the fabrication of a separate color filter, nor a light exposure and development process for each of R, G, and B color patterns, the fabrication cost significantly reduced.

Example 44

A liquid crystal display device of Example 44 was fabricated in the same manner as that described in Example 8, except that the active matrix substrate fabricated in Example 43 was used. The display quality of the resultant liquid crystal display device was examined as in Example 8.

Since the pixel electrodes were formed over the entire surface of the active matrix substrate (i.e., also over the TFTs, the source bus lines, and the gate bus lines), the resultant liquid crystal display device attained such a high aperture ratio that had never been realized by conventional liquid crystal display devices, thereby providing very bright display images. Further, since no color blur or color mixture was observed in the color pixel portions of the active matrix substrate, the color display performance of the resultant liquid crystal display device was excellent. Moreover, using the inexpensive active matrix substrate, the resultant liquid crystal display device could be fabricated at lower cost compared with conventional devices.

Thus, according to the present invention, the active matrix substrate and the liquid crystal display device which are thin, inexpensive, and excellent in display quality (i.e., free from color blur or color mixture and having a high aperture ratio to provide bright display images), together with a method for easily fabricating such an active matrix substrate, are provided. The active matrix substrate and the liquid crystal display device according to the present invention can be preferably used for audiovisual (AV) apparatuses and office automation (OA) apparatuses.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate comprising a scanning line, a signal line, a pixel electrode, a switching element connected with the scanning line, the signal line, and the pixel electrode, and a color pixel portion, wherein at least a portion of the scanning line and the signal line and at least a region of the switching element are covered with a water-repellent organic resin protection film, and the color pixel portion is composed of hydrophilic color ink applied to a portion of the substrate surrounded by the organic resin protection film.

2. An active matrix substrate according to claim 1, wherein the organic resin protection film comprises a resin having a monomer unit having a quaternary ammonium salt moiety represented by formula (I):

(I)

wherein $X^+$ is represented by formula (II):

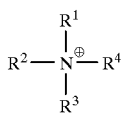
 (II)

wherein $R^1$, $R^2$, $R^3$, and $R^4$ are independently hydrogen, a substituted or non-substituted linear or branched alkyl group having 1 to 12 carbon atoms, or a substituted or non-substituted linear or branched alkenyl group having 2 to 8 carbon atoms.

3. An active matrix substrate according to claim 2, wherein the monomer unit having the quaternary ammonium salt moiety is at least one monomer unit selected from the group consisting of a monomer unit represented by formula (III), a monomer unit represented by formula (IV), a monomer unit represented by formula (V), and a monomer unit represented by formula (VI):

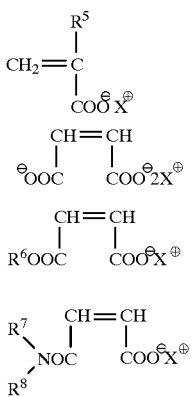
 (III)
 (IV)
 (V)

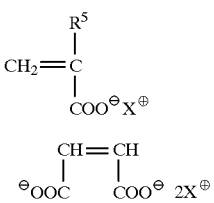
 (VI)

wherein $R^5$ is hydrogen, a methyl group, or a trifluoromethyl group; $R^6$, $R^7$, and $R^8$ are independently selected from the group consisting of hydrogen, a substituted or non-substituted linear or branched alkyl group having 1 to 12 carbon atoms, a substituted or non-substituted linear or branched alkenyl group having 2 to 8 carbon atoms, a substituted or non-substituted aralkyl group, a substituted or non-substituted phenyl group, a heterocyclic group, a linear or branched fluorine-substituted alkyl group having 1 to 12 carbon atoms, and a fluorine-substituted alkylaryl group.

4. An active matrix substrate according to claim 3, wherein the organic resin protection film comprises a resin having at least one monomer unit selected from the group consisting of a monomer unit represented by formula (III), a monomer unit represented by formula (IV), and a monomer unit represented by formula (V):

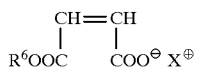
 (III)
 (IV)
 (V)

wherein $R^5$ is hydrogen or a methyl group; $R^6$ is selected from the group consisting of hydrogen, a substituted or non-substituted linear or branched alkyl group having 1 to 12 carbon atoms, a substituted or non-substituted alkenyl group having 2 to 8 carbon atoms, a substituted or non-substituted aralkyl group, a substituted or non-substituted phenyl group, and a heterocyclic group.

5. An active matrix substrate according to claim 3, wherein the organic resin protection film comprises a resin having at least one monomer unit selected from the group consisting of a monomer unit represented by formula 1a (III), a monomer unit represented by formula (IV), and a monomer unit represented by formula (V), and a fluorine-containing monomer unit:

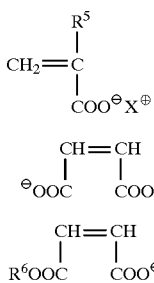
 (III)
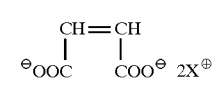
 (IV)
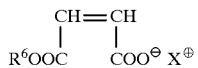
 (V)

wherein $R^5$ is hydrogen or a methyl group; $R^6$ is selected from the group consisting of hydrogen, a substituted or non-substituted linear or branched alkyl group having 1 to 12 carbon atoms, a substituted or non-substituted alkenyl group having 2 to 8 carbon atoms, a substituted or non-substituted aralkyl group, a substituted or non-substituted phenyl group, and a heterocyclic group.

6. An active matrix substrate according to claim 3, wherein the organic resin protection film comprises a resin having at least one monomer unit selected from the group consisting of a monomer unit represented by formula 1a (V) and a monomer unit represented by formula (VI):

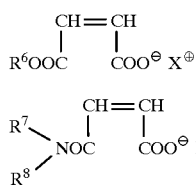
 (V)
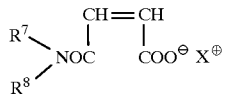
 (VI)

wherein $R^6$ is selected from the group consisting of a linear or branched fluorine-substituted alkyl group having 1 to 12 carbon atoms and a fluorine-substituted alkylaryl group; $R^7$ and $R^8$ are independently selected from the group consisting of hydrogen, a substituted or non-substituted linear or branched alkyl group having 1 to 12 carbon atoms, a substituted or non-substituted linear or branched alkenyl group having 2 to 8 carbon atoms, a substituted or non-substituted aralkyl group, a substituted or non-substituted phenyl group, a heterocyclic group, a linear or branched fluorine-substituted alkyl group having 1 to 12 carbon atoms, and a fluorine-substituted alkylaryl group, at least one of $R^7$ and $R^8$ being selected from the group consisting of a linear or branched fluorine-substituted alkyl group having 1 to 12 carbon atoms and a fluorine-substituted alkylaryl group.

7. An active matrix substrate according to claim 2, wherein the resin comprised in the organic resin protection film further has a fluorine-containing monomer unit.

8. An active matrix substrate according to claim 7, wherein the fluorine-containing monomer unit is a monomer unit represented by formula (VII):

wherein $R^A$ is hydrogen, a methyl group, or a trifluoromethyl group, $R^B$ is a linear or branched fluorine-substituted alkyl group having 1 to 22 carbon atoms or a fluorine-substituted alkylaryl group.

9. An active matrix substrate according to claim 2, wherein the resin comprised in the organic resin protection film further has at least one monomer unit selected from the group consisting of an acrylate monomer unit, a methacrylate monomer unit, a styrene monomer unit, a vinyl acetate monomer unit, and an isobutylene monomer unit.

10. An active matrix substrate according to claim 9, wherein the styrene monomer unit is represented by formula (VIII):

wherein $R^{21}$ is hydrogen or a methyl group, and $R^{22}$ is hydrogen, an alkyl group having 1 to 12 carbon atoms, a nitro group, or a halogen.

11. An active matrix substrate according to claim 2, wherein a composition for forming the organic resin protection film comprises at least one type of polyamino compound.

12. An active matrix substrate according to claim 11, wherein the polyamino compound is a diamino compound represented by formula (X):

wherein A is a bivalent hydrocarbon residue; and $R^{41}$, $R^{42}$, $R^{43}$, and $R^{44}$ are independently hydrogen, a substituted or non-substituted linear or branched alkyl group having 1 to 12 carbon atoms, a substituted or non-substituted cycloalkyl group having 5 to 6 carbon atoms, or a substituted or non-substituted linear or branched alkenyl group having 2 to 8 carbon atoms.

13. An active matrix substrate according to claim 2, wherein a composition for forming the organic resin protection film is rendered hydrophobic from hydrophilic by a conversion of the quaternary ammonium salt moiety of the monomer unit to a —COOH group, to form a water-repellent organic resin protection film.

14. An active matrix substrate according to claim 1, wherein the organic resin protection film comprises carbon black.

15. A liquid crystal display device comprising a pair of substrates and liquid crystal as a display medium interposed between the substrates, wherein at least one of the substrates is the active matrix substrate according to claim 1.

16. A method for fabricating an active matrix substrate, comprising the steps of:

applying a hydrophilic composition for forming an organic resin protection film on a substrate, forming a water-repellent organic resin protection film by rendering the hydrophilic composition applied to the substrate hydrophobic, and forming a color pixel portion by applying hydrophilic color ink to a region of the substrate where the organic resin protection film is not formed.

17. A method for fabricating an active matrix substrate according to claim 16, wherein the color ink is applied to the substrate by an ink jet method.

18. A method for fabricating an active matrix substrate according to claim 16, wherein the hydrophilic composition applied to the substrate is rendered hydrophobic by heating.

* * * * *